(12) United States Patent
Park et al.

(10) Patent No.: US 11,990,585 B2
(45) Date of Patent: May 21, 2024

(54) ELECTROLYTE FORMULATIONS FOR OPTIMAL PERFORMANCE IN Si-CONTAINING LITHIUM ION BATTERIES

(71) Applicant: Enevate Corporation, Irvine, CA (US)

(72) Inventors: Benjamin Yong Park, Irvine, CA (US); Heidi Anderson, Irvine, CA (US); Hong Zhao, Irvine, CA (US); Vincent Giordani, Irvine, CA (US); Sung Ju Cho, Irvine, CA (US); Myunghwan Jeong, Irvine, CA (US); Daniel Sylvinson Muthiah Ravinson, Irvine, CA (US); Samuel Keene, Irvine, CA (US); Mya Le Thai, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 17/890,543

(22) Filed: Aug. 18, 2022

(65) Prior Publication Data

US 2024/0079653 A1    Mar. 7, 2024

(51) Int. Cl.
*H01M 10/0569* (2010.01)
*H01M 4/38* (2006.01)
*H01M 10/0525* (2010.01)
*H01M 10/0567* (2010.01)
*H01M 4/02* (2006.01)

(52) U.S. Cl.
CPC ... *H01M 10/0569* (2013.01); *H01M 10/0525* (2013.01); *H01M 10/0567* (2013.01); *H01M 2004/027* (2013.01); *H01M 4/386* (2013.01)

(58) Field of Classification Search
None
See application file for complete search history.

(56) References Cited

U.S. PATENT DOCUMENTS

| 2005/0196670 | A1* | 9/2005 | Yamaguchi | H01M 10/0569 429/200 |
| 2009/0325065 | A1* | 12/2009 | Fujii | H01M 10/0569 429/207 |
| 2010/0159337 | A1* | 6/2010 | Matsumoto | H01M 10/4235 429/207 |
| 2013/0260261 | A1* | 10/2013 | Kotani | H01M 10/0567 429/332 |
| 2017/0214091 | A1* | 7/2017 | Abe | H01G 11/50 |
| 2018/0108937 | A1* | 4/2018 | Drach | H01M 10/0569 |
| 2020/0303777 | A1* | 9/2020 | Kawasoe | H01M 10/0431 |
| 2022/0123297 | A1* | 4/2022 | Lee | H01M 10/0525 |
| 2022/0140394 | A1* | 5/2022 | He | H01M 50/449 429/332 |

* cited by examiner

*Primary Examiner* — Carlos Barcena
(74) *Attorney, Agent, or Firm* — McAndrews, Held & Malloy, Ltd.

(57) ABSTRACT

Electrolyte formulations for energy storage devices are disclosed. The energy storage device comprises a first electrode and a second electrode, where one or both of the first electrode and the second electrode is a Si-based electrode, a separator between the first electrode and the second electrode, and an electrolyte composition. Electrolyte formulations as described herein are electrolyte compositions comprising two or more components such as solvents, co-solvents, salts and/or additives. In some embodiments, three or more, four or more, five or more, six or more, seven or more, or eight or more components are included in the electrolyte composition.

20 Claims, 15 Drawing Sheets

ELECTROLYTE FORMULATIONS FOR OPTIMAL PERFORMANCE IN Si-CONTAINING LITHIUM ION BATTERIES

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to electrolyte compositions.

BACKGROUND

Conventional approaches for battery electrodes may be costly, cumbersome, and/or inefficient—e.g., they may be complex and/or time-consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using electrolyte compositions, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 15A shows DCIR % increase and FIG. 15B shows thickness change (%).

DETAILED DESCRIPTION

Figure 1:
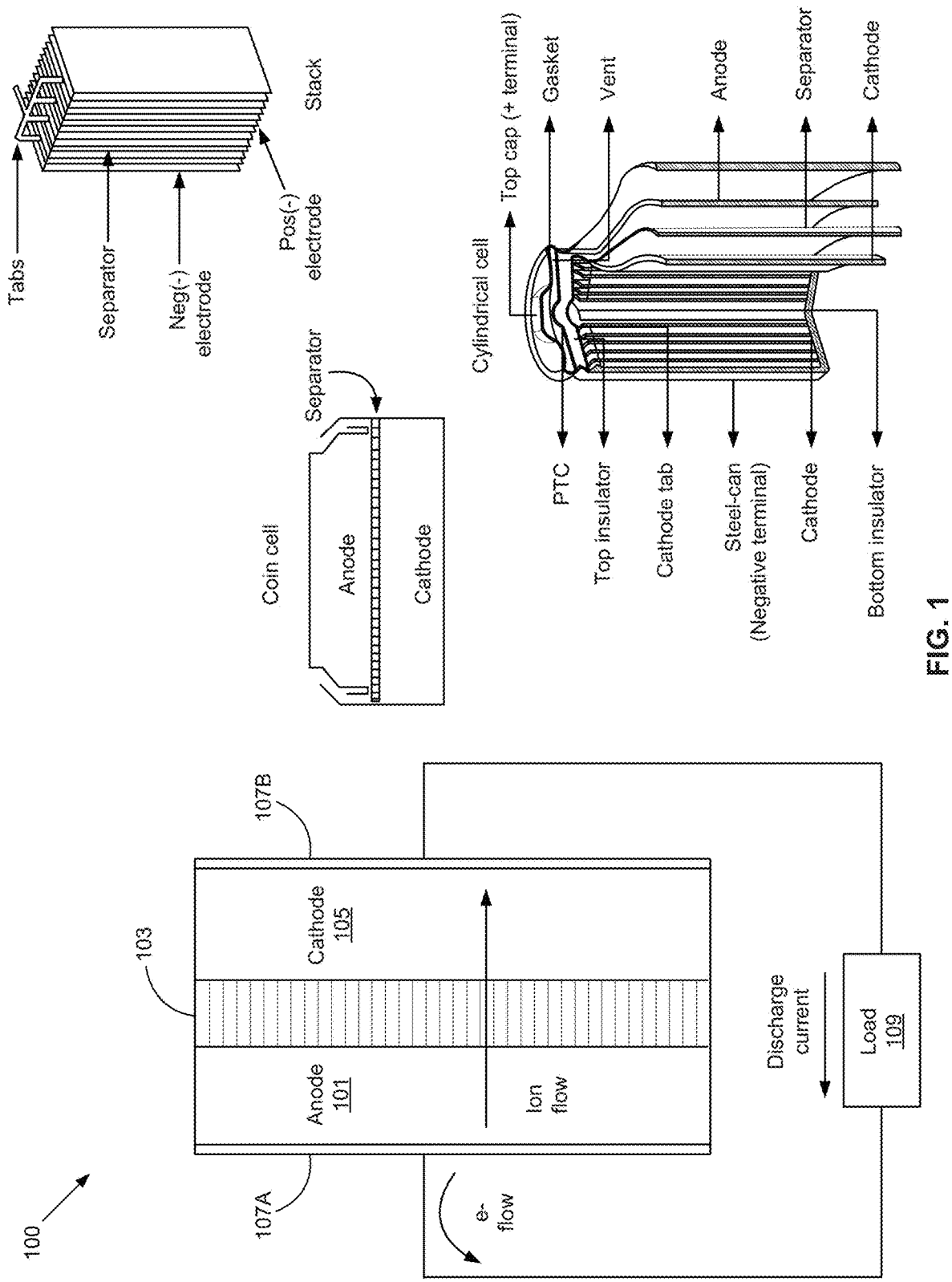
FIG. 1 illustrates an example battery, in accordance with an example embodiment of the disclosure.

FIG. 1 illustrates an example battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1 is a very simplified example merely to show the principle of operation of a lithium-ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high-performance electrochemical energy storage. In devices ranging from small-scale (<100 Wh) to large-scale (>10 kWh), Li ion batteries are widely used over other rechargeable battery chemistries due to their advantages in energy density and cyclability.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. In this regard, different methods or processes may be used in forming electrodes, particularly silicon-dominant (>50% in terms of active material by capacity or by weight) anodes. For example, lamination or direct coating may be used in forming a silicon-containing anode (silicon anode). Examples of such processes are illustrated herein and described with respect to FIGS. 2 and 3. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$, LiFSI, LiTFSI, etc. In an example scenario, the electrolyte may comprise Lithium hexafluorophosphate ($LiPF_6$) and lithium bis(trifluoromethanesulfonyl)imide (LiTFSI) that may be used together in a variety of electrolyte solvents. Lithium hexafluorophosphate ($LiPF_6$) may be present at a concentration of about 0.1 to 4.0 molar (M) and lithium bis(trifluoromethanesulfonyl)imide (LiTFSI) may be present at a concentration of about 0 to 4.0 molar (M). Solvents may comprise one or more cyclic carbonates, such as ethylene carbonate (EC), fluoroethylene carbonate (FEC), or propylene carbonate (PC) as well as linear carbonates, such as ethyl methyl carbonate (EMC), diethyl carbonate (DEC), and dimethyl carbonate (DMC), in various percentages. In some embodiments, the electrolyte solvents may comprise one or more of EC from about 0-40%, FEC from about 2-40% and/or EMC from about 50-70% by weight. In some embodiments, FEC is present in the electrolyte composition at between 10 and 30 percent by weight.

The separator 103 may be wet or soaked with a liquid or gel electrolyte. In addition, in an example embodiment, the separator 103 does not melt below about 100 to 400° C., and exhibits sufficient mechanical properties for battery applications. A battery, in operation, can experience expansion and contraction of the anode 101 and/or the cathode 105. In an example embodiment, the separator 103 can expand and contract by at least about 5 to 10% without tearing or otherwise failing, and may also be flexible.

The separator 103 may be sufficiently porous so that ions can pass through the separator once wet with, for example, a liquid or gel electrolyte. Alternatively (or additionally), the separator may absorb the electrolyte through gelling or other processes even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material and a current collector, such as a copper sheet. Carbon is often used because it has excellent electrochemical properties and is also electrically conductive. Anode electrodes currently used in rechargeable lithium-ion cells typically have a specific capacity of approximately 200 milliamp hours per gram (mAh/g). Graphite, the active material used in most lithium-ion battery anodes, has a theoretical energy density of 372 mAh/g. In comparison, silicon has a high theoretical capacity of 4200 mAh/g. In order to increase volumetric and gravimetric energy density of lithium-ion batteries, silicon may be used as the active material for the cathode 105 or anode 101. Si anodes may be in the form of a composite on a current collector, with >50% Si by capacity or weight in the composite layer.

In an example scenario, the anode 101 and cathode 105 store the ions used for separation of charge, such as lithium ions. In this example, the electrolyte carries positively charged lithium ions from the anode 101 to the cathode 105 in discharge mode, as shown in FIG. 1, and vice versa through the separator 103 in charge mode. The movement of the lithium ions and reactions with the electrodes create free electrons in one electrode which creates a charge at the opposite current collector. The electrical current then flows from the current collector where charge is created through the load 109 to the other current collector. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 through the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density and high power density of lithium-ion batteries are achieved with the development of high-capacity and high-voltage cathodes, high-capacity anodes and electrolytes with high voltage stability and interfacial compatibility with electrodes. Functionally non-flammable or less-flammable electrolytes could be used to improve safety. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (Super P), vapor grown carbon fibers (VGCF), and a mixture of the two have previously been incorporated into the anode to improve electrical conductivity and otherwise improve performance. The synergistic interactions between the two carbon materials may facilitate electrical contact throughout the large volume changes of the silicon anode during charge and discharge as well as provide additional mechanical robustness to the electrode and provide mechanical strength (e.g., to keep the electrode material in place). These contact points (especially when utilizing high-aspect-ratio conductive materials) facilitate the electrical contact between anode material and current collector to mitigate the isolation (island formation) of the electrode material while also improving conductivity in between silicon regions. Graphenes and carbon nanotubes may be used because they may show similar benefits. Thus, in some instances, a mixture of two or more of carbon black, vapor grown carbon fibers, graphene, and carbon nanotubes may be used independently or in combinations for the benefits of conductivity and other performance.

State-of-the-art lithium-ion batteries typically employ a graphite-dominant anode which is a lithium intercalation type anode. Silicon-dominant anodes, however, offer improvements compared to graphite-dominant Li-ion batteries. Silicon exhibits both higher gravimetric (4200 mAh/g vs. 372 mAh/g for graphite) and volumetric capacities (2194 mAh/L vs. 890 mAh/L for graphite). In addition, Si has a higher redox reaction potential versus Li compared to graphite, with a voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and dilithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life. Therefore, silicon anodes require a strong conductive matrix that (a) holds silicon particles together in the anode, (b) is flexible enough to accommodate the large volume expansion and contraction of silicon, and (c) allows a fast conduction of electrons within the matrix.

Therefore, there is a trade-off among the functions of active materials, conductive additives and polymer binders. The balance may be adversely impacted by high energy density silicon anodes with low conductivity and huge volume variations described above. Polymer binder(s) may be pyrolyzed to create a pyrolytic carbon matrix with embedded silicon particles. In addition, the polymers may be selected from polymers that are completely or partially soluble in water or other environmentally benign solvents or mixtures and combinations thereof. Polymer suspensions of materials that are non-soluble in water could also be utilized.

In some embodiments, dedicated systems and/or software may be used to control and manage batteries or packs thereof. In this regard, such dedicated systems may comprise suitable circuitry for running and/or executing control and manage related functions or operations. Further, such software may run on suitable circuitry, such as on processing circuitry (e.g., general processing units) already present in the systems or it may be implemented on dedicated hardware. For example, battery packs (e.g., those used in electric vehicles) may be equipped with a battery management system (BMS) for managing the batteries (or packs) and operations. An example battery management system (BMS) is illustrated in and described in more detail with respect to FIG. 4.

Figure 2:
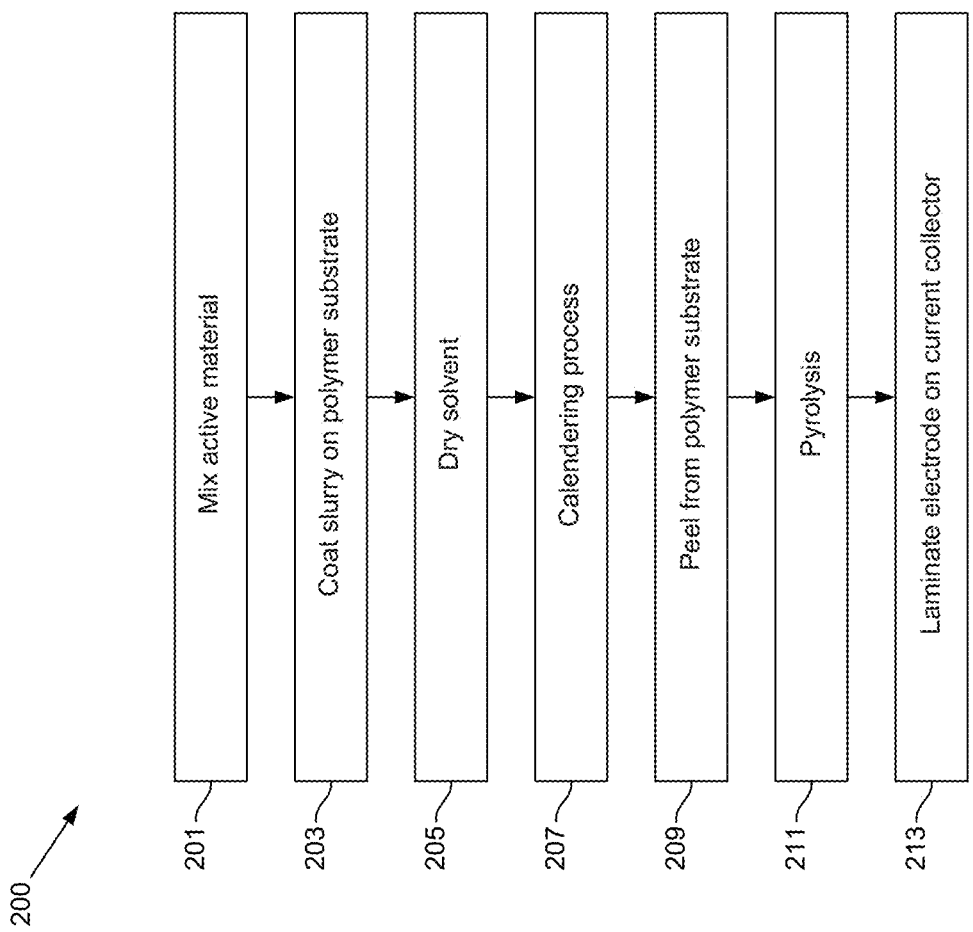
FIG. 2 is a flow diagram of an example lamination process for forming a silicon-dominant anode cell, in accordance with an example embodiment of the disclosure.

FIG. 2 is a flow diagram of an example lamination process for forming a silicon-dominant anode cell. This process employs a high-temperature pyrolysis process on a substrate, layer removal, and a lamination process to adhere the active material layer to a current collector. This strategy may also be adopted by other types of anodes, such as graphite, conversion type anodes, such as transition metal oxides, transition metal phosphides, and other alloy type anodes, such as Sn, Sb, Al, P, etc.

To fabricate an anode, the raw electrode active material is mixed in step 201. In the mixing process, the active material may be mixed to make a slurry with a binder/resin (such as water soluble PI (polyimide), PAI (polyamideimide), carboxymethyl cellulose (CMC), styrene-butadiene rubber (SBR), poly(acrylic acid) (PAA), Sodium Alginate, Phenolic or other water soluble resins and mixtures and combinations thereof), solvent, rheology modifiers, surfactants, pH modifiers, and conductive additives. The materials may comprise carbon nanotubes/fibers, graphene sheets, metal polymers, metals, semiconductors, and/or metal oxides, for example. Silicon powder with a 1-30 or 5-30 μm particle size, for example, may then be dispersed in polyamic acid resin, PAI, or PI (15-25% solids in N-Methyl pyrrolidone (NMP) or deionized (DI) water) at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%. The pH of the slurry can be varied from acidic to basic, which may be beneficial for controlling the solubility, conformation, or adhesion behavior of water soluble polyelectrolytes, such as polyamic acid, carboxymethyl cellulose, or polyacrylic acid. Ionic or non-ionic surfactants may be added to facilitate the wetting of the insoluble components of the slurry or the substrates used for coating processes. The particle size and mixing times may be varied to configure the electrode coating layer density and/or roughness.

Furthermore, cathode electrode coating layers may be mixed in step 201, and coated (e.g., onto aluminum), where the electrode coating layer may comprise cathode material mixed with carbon precursor and additive as described above for the anode electrode coating layer. The cathode material may comprise Lithium Nickel Cobalt Manganese Oxide (NMC (also called NCM): $LiNi_x Co_y Mn_z O_2$, $x+y+z=1$), Lithium Iron Phosphate (LFP: $LiFePO_4/C$), Lithium Nickel Manganese Spinel (LNMO: e.g. $LiNi_{0.5} Mn_{1.5}O_4$), Lithium Nickel Cobalt Aluminum Oxide (NCA: $LiNi_a Co_b Al_c O_2$, $a+b+c=1$), Lithium Manganese Oxide (LMO: e.g. $LiMn_2O_4$), a quaternary system of Lithium Nickel Cobalt Manganese Aluminum Oxide (NCMA: e.g. $Li[Ni_{0.89} Co_{0.05} Mn_{0.05}Al_{0.01}]O_2$, Lithium Cobalt Oxide (LCO: e.g. $LiCoO_2$), and other Li-rich layer cathodes or similar materials, or combinations thereof. The particle size and mixing times may be varied to configure the electrode coating layer density and/or roughness.

In step 203, the slurry may be coated on a substrate. In this step, the slurry may be coated onto a polyester, polyethylene terephthalate (PET), or Mylar film at a loading of, e.g., 2-4 mg/cm$^2$ and then undergo drying in step 205 to an anode coupon with high Si content and less than 15% residual solvent content. This may be followed by an optional calendering process in step 207, where a series of hard pressure rollers may be used to finish the film/substrate into a smoothed and denser sheet of material.

In step 209, the active-material-containing film may then be removed from the PET, where the active material layer may be peeled off the polymer substrate. The peeling may be followed by a pyrolysis step 211 where the material may be heated to, e.g., 600-1250° C. for 1-3 hours, cut into sheets, and vacuum dried using a two-stage process (120° C. for 15 h, 220° C. for 5 h). The peeling process may be skipped if a polypropylene (PP) substrate is used, and PP can leave ~2% char residue upon pyrolysis.

In step 213, the electrode material may be laminated on a current collector. For example, a 5-20 μm thick copper foil may be coated with polyamide-imide with a nominal loading of, e.g., 0.2-0.6 mg/cm$^2$ (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

The cell may be assessed before being subject to a formation process. The measurements may comprise impedance values, open circuit voltage, and electrode and cell thickness measurements. The formation cycles are defined as any type of charge/discharge of the cell that is performed to prepare the cell for general cycling and is considered part of the cell production process. Different rates of charge and discharge may be utilized in formation steps. During formation, the initial lithiation of the anode may be performed, followed by dilithiation. Cells may be clamped during formation and/or cycling.

Figure 3:
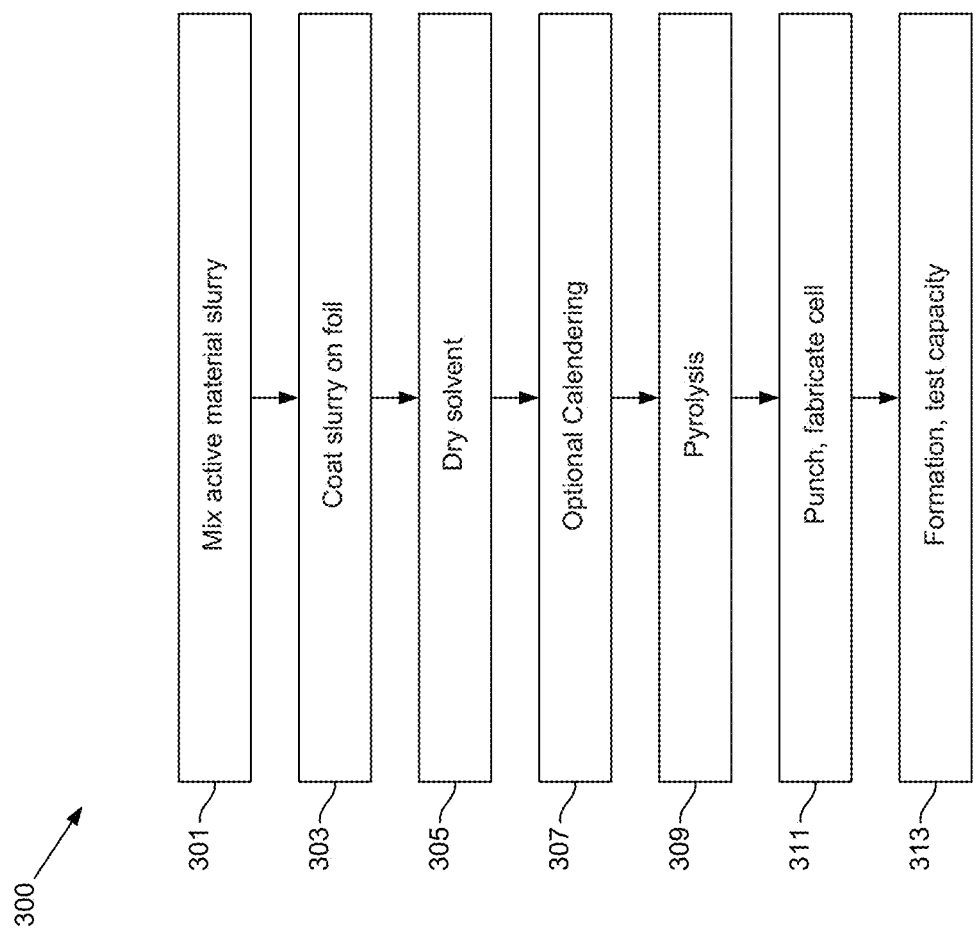
FIG. 3 is a flow diagram of an example direct coating process for forming a silicon-dominant anode cell, in accordance with an example embodiment of the disclosure.

FIG. 3 is a flow diagram of a direct coating process for forming a silicon-dominant anode cell, in accordance with an example embodiment of the disclosure. This process comprises physically mixing the active material, conductive additive, and binder together, and coating the mixed slurry directly on a current collector before pyrolysis. This example process comprises a direct coating process in which an anode or cathode slurry is directly coated on a copper foil using a binder such as CMC, SBR, PAA, Sodium Alginate, PAI, PI and mixtures and combinations thereof.

In step 301, the active material may be mixed with, e.g., a binder/resin (such as PI, PAI or phenolic), solvent (such as NMP, water, other environmentally benign solvents or their mixtures and combinations thereof), and conductive additives. The materials may comprise carbon nanotubes/fibers, graphene sheets, metal polymers, metals, semiconductors, and/or metal oxides, for example. Silicon powder with a 1-30 μm particle size, for example, may then be dispersed in polyamic acid resin, PAI, PI (15% solids in DI water or N-Methyl pyrrolidone (NMP)) at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%.

Furthermore, cathode active materials may be mixed in step 301, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 303, the slurry may be coated on a copper foil. In the direct coating process described here, an anode slurry is coated on a current collector with residual solvent followed by a drying and a calendering process for densification. A pyrolysis step (~500-800° C.) is then applied such that carbon precursors are partially or completely converted into glassy carbon or pyrolytic carbon. Similarly, cathode active materials may be coated on a foil material, such as aluminum, for example. The active material layer may undergo a drying process in step 305 to reduce residual solvent content. An optional calendering process may be utilized in step 307 where a series of hard pressure rollers may be used to finish the film/substrate into a smoother and denser sheet of material. In step 307, the foil and coating optionally proceeds through a roll press for calendering where the surface is smoothed out and the thickness is controlled to be thinner and/or more uniform.

In step 309, the active material may be pyrolyzed by heating to 500-1000° C. such that carbon precursors are partially or completely converted into glassy carbon. Pyrolysis can be done either in roll form or after punching. If the electrode is pyrolyzed in a roll form, it will be punched into individual sheets after pyrolysis. The pyrolysis step may result in an anode active material having silicon content greater than or equal to 50% by capacity or by weight. In an example scenario, the anode active material layer may comprise 20 to 95% silicon. In another example scenario may comprise 50 to 95% silicon by weight. In instances where the current collector foil is not pre-punched/pre-perforated, the formed electrode may be perforated with a punching roller, for example. The punched anodes may then be used to assemble a cell with cathode, separator and electrolyte materials. In some instances, separator with significant adhesive properties may be utilized. In some embodiments, the anode active material has silicon content greater than or equal to 70% by weight.

Further, once pyrolyzed, the remainder of the anode (that is not silicon) may be pyrolytic carbon. In some embodiments, when strengthening additives are utilized, the remainder of the anode that is not silicon may comprise both pyrolytic carbon and strengthening additives. In some embodiments, the amount of pyrolytic carbon may be less than or equal to 30%; or be less than or equal to 15%. When strengthening additives are present, the amount of strengthening additives may be less than or equal to 30%.

In step 313, the cell may be assessed before being subject to a formation process. The measurements may comprise impedance values, open circuit voltage, and cell and/or electrode thickness measurements. During formation, the initial lithiation of the anode may be performed, followed by dilithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in formation steps.

Figure 4:
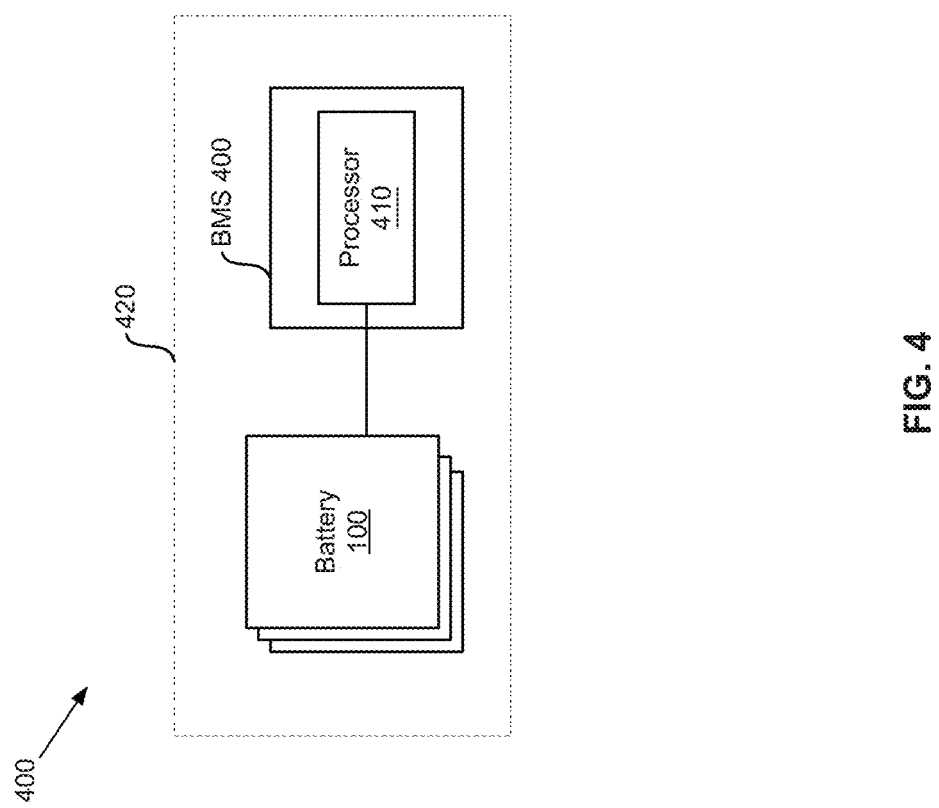
FIG. 4 illustrates an example battery management system (BMS) for use in managing operation of batteries, in accordance with an example embodiment of the disclosure.

FIG. 4 illustrates an example battery management system (BMS) for use in managing operation of batteries. Shown in FIG. 4 is battery management system (BMS) 400.

The battery management system (BMS) 400 may comprise suitable circuitry (e.g., processor 410) configured to manage one or more batteries (e.g., each being an instance of the battery 100 as described with respect with FIG. 1). In this regard, the BMS 400 may be in communication and/or coupled with each battery 100. In some implementations, a separate processor (e.g., a conventional processor, such as an electronic control unit (ECU), a microcontroller unit (ECU), or the like), or several such separate processors, may be used, and may be configured to handle algorithms or control functions with regards to the batteries. In such implementations, such processor(s) may be connected to the batteries, such as through the processor 410, and thus may be treated as part of the BMS 400 and acting as part of processor 410.

In some embodiments, the battery 100 and the BMS 400 may be in communication and/or coupled with each other, for example, via electronics or wireless communication. In some embodiments, the BMS 400 may be incorporated into the battery 100. Alternatively, in some embodiments, the BMS 400 and the battery 100 may be combined into a common package 420. Further, in some embodiments, the BMS 400 and the battery 100 may be separate devices/components, and may only be in communication with one another when present in the same system. The disclosure is not limited to any particular arrangement, however.

As the demands for both zero-emission electric vehicles and grid-based energy storage systems increase, lower costs and improvements in energy density, power density, and safety of lithium (Li)-ion batteries are highly desirable. Enabling the high energy density and safety of Li-ion batteries requires the development of high-capacity, and high-voltage cathodes, high-capacity anodes, and accordingly functional electrolytes with high voltage stability, interfacial compatibility with electrodes and safety.

In the present disclosure, electrolyte formulations are disclosed to address thermal stability and enable commercially-viable performance for Si-containing cells. Electrolyte formulations as described herein are electrolyte compositions comprising two or more components such as solvents, co-solvents, salts and/or additives. In some embodiments, three or more, four or more, five or more, six or more, seven or more, or eight or more components are included in the electrolyte composition.

A lithium-ion battery typically includes a separator and/or electrolyte between an anode and a cathode. In one class of batteries, the separator, cathode, and anode materials are individually formed into sheets or films. Sheets of the cathode, separator, and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

As discussed above, a lithium-ion battery typically includes a separator and/or electrolyte between an anode and a cathode. Separators may be formed as sheets or films, which are then stacked or rolled with the anode and cathode (e.g., electrodes) to form the battery. The separator may comprise a single continuous or substantially continuous sheet or film, which can be interleaved between adjacent electrodes of the electrode stack. The separator may be configured to facilitate electrical insulation between the anode and the cathode, while still permitting ionic transport. In some embodiments, the separator may comprise a porous material. Functional compounds may be used to modify the separator to prepare different types of functional separators to improve the cycle performance of Li-ion batteries or Li-metal batteries.

Si is one of the most promising anode materials for Li-ion batteries due to its high specific gravimetric and volumetric capacity (discussed above), and low lithiation potential (<0.4 V vs. Li/Li+). Cathode materials may include Lithium Nickel Cobalt Manganese Oxide (NMC (NCM): $LiNi_x Co_y Mn_z O_2$, x+y+z=1); Lithium Iron Phosphate (LFP: $LiFePO_4$/C); Lithium Nickel Manganese Spinel (LNMO: $LiNi_{0.5} Mn_{1.5} O_4$); Lithium Nickel Cobalt Aluminium Oxide (NCA: $LiNi_a Co_b Al_c O_2$, a+b+c=1); Lithium Manganese Oxide (LMO: $LiMn_2O_4$); and Lithium Cobalt Oxide (LCO: $LiCoO_2$).

Among the various cathodes presently available, layered lithium transition-metal oxides such as Ni-rich $LiNi_x Co_y Mn_z O_2$ (NCM, 0≤x, y, z<1) or $LiNi_x Co_y Al_z O_2$ (NCA, 0≤x, y, z<1) are promising ones due to their high theoretical capacity (~280 mAh/g) and relatively high average operating potential (3.6 V vs Li/Li+). In addition to Ni-rich NCM or NCA cathode, $LiCoO_2$ (LCO) is also a very attractive cathode material because of its relatively high theoretical specific capacity of 274 mAh $g^{-1}$, high theoretical volumetric capacity of 1363 mAh $cm^{-3}$, low self-discharge, high discharge voltage, and good cycling performance. Coupling Si anodes with high-voltage Ni-rich NCM (or NCA) or LCO cathodes can deliver more energy than conventional Li-ion batteries with graphite-based anodes, due to the high capacity of these new electrodes. However, both Si-based anodes and high-voltage Ni-rich NCM (or NCA) or LCO cathodes face formidable technological challenges, and long-term cycling stability with high-Si anodes paired with NCM or NCA cathodes has yet to be achieved.

For anodes, silicon-based materials can provide significant improvement in energy density. However, the large volumetric expansion (e.g., >300%) during the Li alloying/dealloying processes can lead to disintegration of the active material and the loss of electrical conduction paths, thereby reducing the cycling life of the battery. In addition, an unstable solid electrolyte interphase (SEI) layer can develop on the surface of the cycled anodes and leads to an endless exposure of Si particle surfaces to the liquid electrolyte. This results in an irreversible capacity loss at each cycle due to the reduction at the low potential where the liquid electrolyte reacts with the exposed surface of the Si anode. In addition, oxidative instability of the conventional non-aqueous electrolyte takes place at voltages beyond 4.5 V, which can lead to accelerated decay of cycling performance. Because of the generally inferior cycle life of Si compared to graphite, only a small amount of Si or Si alloy is used in conventional anode materials.

The cathode (e.g., NCM (or NCA) or LCO) usually suffers from inferior stability and a low capacity retention at a high cut-off potential. The reasons can be ascribed to the unstable surface layer's gradual exfoliation, the continuous electrolyte decomposition, and the transition metal ion dissolution into electrolyte solution; further causes for inferior performance can be: (i) structural changes from layered to spinel upon cycling; (ii) Mn- and Ni-dissolution giving rise to surface side reactions at the graphite anode; and (iii) oxidative instability of conventional carbonate-based electrolytes at high voltage. The major limitations for LCO cathodes are high cost, low thermal stability, and fast capacity fade at high current rates or during deep cycling. LCO cathodes are expensive because of the high cost of Co. Low thermal stability refers to an exothermic release of oxygen when a lithium metal oxide cathode is heated. In order to make good use of Si anode//NCM or NCA cathode, and Si anode//LCO cathode-based Li-ion battery systems, the aforementioned barriers need to be overcome.

As discussed above, Li-ion batteries are being intensively pursued in the electric vehicle markets and stationary energy storage devices. To further improve the cell energy density, high-voltage layered transition metal oxide cathodes, examples including Ni-rich (e.g. NCA, NCM), Li-rich cathodes, and high capacity and low-voltage anodes, such as Si, Ge, etc may be utilized. However, the performance deterioration of full cells, in which these oxides are paired with Si or other high capacity anodes, increases markedly at potentials exceeding 4.30 V, limiting their wider use as high-energy cathode materials. Although a higher Ni content provides a higher specific capacity for Ni-rich NCM or NCA cathodes, it involves surface instability because of the unstable $Ni^{4+}$ increase during the charging process. As it is favorable to convert the unstable $Ni^{4+}$ into the more stable $Ni^{3+}$ or $Ni^{2+}$, $Ni^{4+}$ triggers severe electrolyte decomposition at the electrode/electrolyte interface, leading to the reduction of $Ni^{4+}$ and the oxidative decomposition of the electrolytes. Electrolyte decomposition at the electrolyte/electrode interface causes the accumulation of decomposed adducts on the NCM cathode surface. This hinders Li+ migration between the electrolyte and electrode, which in turn results in the rapid fading of the cycling performance. Thus the practical integration of a silicon anode in Li-ion batteries faces challenges such as large volume changes, unstable solid-electrolyte interphase, electrolyte drying out, etc.

As discussed above, typical electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would likely be unable to mechanically support itself. Therefore, conventional electrodes require a support structure such as the collector to be able to function as an electrode. The electrode (e.g., anode or cathode) compositions described in this application can produce self-supported electrodes. The need for a metal foil current collector is eliminated or minimized because the conductive carbonized polymer is used for current collection in the anode structure as well as for mechanical support. In typical applications for the mobile industry, a metal current collector is typically added to ensure sufficient rate performance. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

In order to increase the volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, have also been reported as viable candidates as active materials for the negative or positive electrodes. Small particle sizes (for example, sizes in the nanometer range) generally can increase cycle life performance. They also can display very high initial irreversible capacity. However, small particle sizes also can result in very low volumetric energy density (for example, for the overall cell stack) due to the difficulty of packing the active material. Larger particle sizes, (for example, sizes in the micron range) generally can result in higher density anode material. However, the expansion of the silicon active material can result in poor cycle life due to particle cracking. For example, silicon can swell over 300% upon lithium insertion. Because of this expansion, anodes including silicon should be allowed to expand while maintaining electrical contact between the silicon particles. The use of aqueous-based polymers as disclosed herein for Si anodes may allow for free spaces to be created among Si particles during the pyrolysis process. These free spaces may allow for the necessary expansion, creating the extra volume required for Si expansion during cycling.

Cathode electrodes (positive electrodes) described herein may include metal oxide cathode materials, such as Lithium Cobalt Oxide ($LiCoO_2$) (LCO), Ni-rich oxides, high voltage cathode materials, lithium-rich oxides, nickel-rich layered oxides, lithium-rich layered oxides, high-voltage spinel oxides, and high-voltage polyanionic compounds. Ni-rich oxides and/or high voltage cathode materials may include NCM and NCA. Example of NCM materials include, but are not limited to, $LiNi_{0.6} Co_{0.2} Mn_{0.2}O_2$ (NCM-622) and $LiNi_{0.8} Co_{0.1} Mn_{0.1}O_2$ (NCM-811). Lithium-rich oxides may include $xLi_2Mn_3O_2 \cdot (1-x)LiNi_a Co_b Mn_cO_2$. Nickel-rich layered oxides may include $LiNi_{1+x} M_{1-x}O_z$ (where M=Co, Mn or Al). Lithium-rich layered oxides may include $LiNi_{1+x} M_{1-x}O_2$ (where M=Co, Mn or Ni). High-voltage spinel oxides may include $LiNi_{0.5} Mn_{1.5}O_4$. High-voltage polyanionic compounds may include phosphates, sulfates, silicates, etc.

In certain embodiments, the positive electrode may be one of NCA, NCM, LMO or LCO. The NCM cathodes include NCM 9 0.5 0.5, NCM811, NCM622, NCM532, NCM523, NCM433, NCM111, NCMA, and others. In further embodiments, the positive electrode comprises a lithium-rich layered oxide $xLi_2MnO_3 \cdot (1-x)LiNi_a Co_b Mn_cO_2$; nickel-rich layered oxide $LiNi_{1-x} M_xO_2$ (M=Co, Mn and Al); or lithium rich layered oxide $LiNi_{1+x} M_{1-x} O_2$ (M=Co, Mn and Ni) cathode.

As described herein and in U.S. patent application Ser. Nos. 13/008,800 and 13/601,976, entitled "Composite Materials for Electrochemical Storage" and "Silicon Particles for Battery Electrodes," respectively, certain embodiments utilize a method of creating monolithic, self-supported anodes using a carbonized polymer. Because the polymer is converted into an electrically conductive and electrochemically active matrix, the resulting electrode is conductive enough that, in some embodiments, a metal foil or mesh current collector can be omitted or minimized. The converted polymer also acts as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 1200 mAh/g that can be due to, for example, 1) the use of silicon, 2) elimination or substantial reduction of metal current collectors, and 3) being comprised entirely or substantially entirely of active material.

As described herein and in U.S. patent application Ser. No. 14/800,380, entitled "Electrolyte Compositions for Batteries," the entirety of which is hereby incorporated by reference, composite materials can be used as an anode in most conventional Li-ion batteries; they may also be used as the cathode in some electrochemical couples with additional additives. The composite materials can also be used in either secondary batteries (e.g., rechargeable) or primary batteries (e.g., non-rechargeable). In some embodiments, the composite materials can be used in batteries implemented as a pouch cell, as described in further details herein. In certain embodiments, the composite materials are self-supported structures. In further embodiments, the composite materials are self-supported monolithic structures. For example, a collector may be included in the electrode comprised of the composite material. In certain embodiments, the composite material can be used to form carbon structures discussed in U.S. patent application Ser. No. 12/838,368 entitled "Carbon Electrode Structures for Batteries," the entirety of which is hereby incorporated by reference. Furthermore, the composite materials described herein can be, for example, silicon composite materials, carbon composite materials, and/or silicon-carbon composite materials.

In some embodiments, the largest dimension of the silicon particles can be less than about 40 µm, less than about 1 µm, between about 10 nm and about 40 µm, between about 10 nm and about 1 µm, less than about 500 nm, less than about 100 nm, and about 100 nm. All, substantially all, or at least some of the silicon particles may comprise the largest dimension described above. For example, an average or median largest dimension of the silicon particles can be less than about 40 µm, less than about 1 µm, between about 10 nm and about 40 µm, between about 10 nm and about 1 µm, less than about 500 nm, less than about 100 nm, and about 100 nm. The amount of silicon in the composite material can be greater than zero percent by weight of the mixture and composite material. In certain embodiments, the mixture comprises an amount of silicon, the amount being within a range of from about 0% to about 95% by weight, including from about 30% to about 95% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight; greater than 0% and less than about 95% by weight; or between about 50% and about 95% by weight. Additional embodiments of the amount of silicon in the composite material include more than about 50% by weight, between about 30% and about 95% by weight, between about 50% and about 85% by weight, and between about 75% and about 95% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

As described herein, micron-sized silicon particles can provide good volumetric and gravimetric energy density combined with good cycle life. In certain embodiments, to obtain the benefits of both micron-sized silicon particles (e.g., high energy density) and nanometer-sized silicon particles (e.g., good cycle behavior), silicon particles can have an average particle size in the micron range and a surface including nanometer-sized features. In some embodiments, the silicon particles have an average particle size (e.g., average diameter or average largest dimension) between about 0.1 µm and about 30 µm or between about 0.1 µm and all values up to about 30 µm. For example, the silicon particles can have an average particle size between about 0.5 µm and about 25 µm, between about 0.5 µm and about 20 µm, between about 0.5 µm and about 15 µm, between about 0.5 µm and about 10 µm, between about 0.5 µm and about 5 µm, between about 0.5 µm and about 2 µm, between about 1 µm and about 20 µm, between about 1 µm and about 15 µm, between about 1 µm and about 10 µm, between about 5 µm and about 20 µm, etc. Thus, the average particle size can be any value between about 0.1 µm and about 30 µm, e.g., 0.1 µm, 0.5 µm, 1 µm, 5 µm, 10 µm, 15 µm, 20 µm, 25 µm, and 30 µm.

The composite material can be formed by pyrolyzing a polymer precursor. The amount of carbon obtained from the precursor can be about 50 weight percent by weight of the composite material. In certain embodiments, the amount of carbon from the precursor in the composite material is about 10% to about 25% by weight. The carbon from the precursor can be hard carbon. Hard carbon can be a carbon that does not convert into graphite even with heating over 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. A soft carbon precursor can be used if it does not melt at the heat treatment temperatures used. In some embodiments, the amount of carbon in the composite material has a value within a range of from about 10% to about 25% by weight, about 20% by weight, or more than about 50% by weight. In some embodiments, there may be greater than 0% and less than about 90% by weight of one or more types of carbon phases. In certain embodiments, the carbon phase is substantially amorphous. In other embodiments, the carbon phase is substantially crystalline. In further embodiments, the carbon phase includes amorphous and crystalline carbon. The carbon phase can be a matrix phase in the composite material. The carbon can also be embedded in the pores of the additives including silicon. The carbon may react with some of the additives to create some materials at interfaces. For example, there may be a silicon carbide layer between the silicon particles and the carbon.

In certain embodiments, graphite particles are added to the mixture. Advantageously, graphite can be an electrochemically active material in the battery as well as an elastically deformable material that can respond to the volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, the largest dimension of the graphite particles is between about 0.5 microns and about 20 microns. All, substantially all, or at least some of the graphite particles may comprise the largest dimension described herein. In further embodiments, an average or median largest dimension of the graphite particles is between about 0.5 microns and about 20 microns. In certain embodiments, the mixture includes greater than 0% and less than about 80% by weight of graphite particles. In further embodiments, the composite material includes about 1% to about 20% by weight graphite particles. In further embodiments, the composite material includes about 40% to about 75% by weight graphite particles.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a largest dimension of the conductive particles is between about 10 nanometers and about 7 millimeters. All, substantially all, or at least some of the conductive particles may comprise the largest dimension described herein. In further embodiments, an average or median largest dimension of the conductive particles is between about 10 nm and about 7 millimeters. In certain embodiments, the mixture includes greater than zero and up to about 80% by weight conductive particles. In further embodiments, the composite material includes about 45% to about 80% by weight conductive particles. The conductive particles can be conductive carbon including carbon blacks, carbon fibers, carbon nanofibers, carbon nanotubes, graphite, graphene, etc. Many carbons that are considered as conductive additives that are not electrochemically active become active once pyrolyzed in a polymer matrix. Alternatively, the conductive particles can be metals or alloys including copper, nickel, or stainless steel.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In some embodiments, the full capacity of the composite material may not be utilized during the use of the battery in order to improve battery life (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to a gravimetric capacity of about 550 to about 850 mAh/g. Although the maximum gravimetric capacity of the composite material may not be utilized, using the composite material at a lower capacity can still achieve a higher capacity than certain lithium-ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 60% of the composite material's maximum gravimetric capacity or below about 50% of the composite material's maximum gravimetric capacity.

An electrolyte composition for a lithium-ion battery can include one or more solvents and a lithium-ion source, such as a lithium-containing salt. The composition of the electrolyte may be selected to provide a lithium-ion battery with improved performance. In some embodiments, the electrolyte may contain an electrolyte additive. As described herein, a lithium-ion battery may include a first electrode, a second electrode, a separator between the first electrode and the second electrode, and an electrolyte in contact with the first electrode, the second electrode, and the separator. The electrolyte serves to facilitate ionic transport between the first electrode and the second electrode. In some embodiments, the first electrode and the second electrode can refer to anode and cathode or cathode and anode, respectively. Electrolytes and/or electrolyte compositions may be a liquid, solid, or gel.

In lithium-ion batteries, the most widely used electrolytes are non-aqueous liquid electrolytes; these may comprise a lithium-containing salt (e.g., $LiPF_6$) and low molecular weight carbonate solvents as well as various small amounts of functional additives. $LiPF_6$ holds a dominant position in commercial liquid electrolytes due to its well-balanced properties. However, $LiPF_6$ has problems such as high reactivity towards moisture and poor thermal stability. These issues are primarily attributed to the equilibrium decomposition reaction of $LiPF_6$. The P—F bond in $LiPF_6$ and $PF_5$ is rather labile towards hydrolysis by inevitable trace amounts of moisture in batteries. Besides, as a strong Lewis acid, $PF_5$ is also able to initiate reactions with carbonate solvents and causes further electrolyte degradation. Moreover, a temperature rise further accelerates the decomposition reaction of $LiPF_6$ and consequently promotes subsequent parasitic reactions. This is also a reason for faster aging of current lithium-ion batteries at elevated temperatures, as compared to room temperature.

As discussed above, $LiPF_6$ is ubiquitous in most commercial electrolytes, however, it can be unstable at higher temperatures (>60° C.) especially in the presence of FEC and can lead to excessive gassing in high Ni-content systems at elevated temperature. $LiBF_4$ has higher chemical and thermal stability than $LiPF_6$ while still being able to prevent Al corrosion when used in combination with high molarities of LiFSI/LiTFSI salts. $LiBF_4$ can therefore serve as a suitable candidate to replace $LiPF_6$ completely/partially in electrolyte formulations to improve high temperature performance and stability.

In some embodiments, the electrolyte for a lithium ion battery may include a solvent comprising a fluorine-containing component, such as a fluorine-containing cyclic carbonate, a fluorine-containing linear carbonate, and/or a fluoroether. In some embodiments, the electrolyte can include more than one solvent. For example, the electrolyte may include two or more co-solvents. In some embodiments, at least one of the co-solvents in the electrolyte is a fluorine-containing compound.

The fluorine-containing compound includes, but is not limited to one or more of FEC (fluoroethylene carbonate), F2EC (difluoroethylene carbonate), F-EPE (fluorinated monoether), FDE (fluorinated diether), TTE (1,1,2,2-tetrafluoroethyl-2,2,3,3-tetrafluoropropyl ether), HFPM (1,1,1,3,3,3-hexafluoroisopropyl methyl ether), PTM (Phenyl trifluoromethane sulfonate), NOB (N,O-bis(trimethylsilyl)-trifluoroacetamide), FB (fluorobenzene), FEMC (2-fluoroethyl methyl carbonate), FDMC (fluoromethyl methyl carbonate), FPC (4-fluoromethyl-1,3 dioxolan-2-one), and/or F3EMC (methyl 2,2,2-trifluoroethyl carbonate). The monoethers and diethers above may include: Monoethers: 1,1,2,2-Tetrafluoro-3-(1,1,2,2-tetrafluoroethoxy)-propane (TFTFEP), methyl nanofluorobutyl ether (MFE), ethyl nanofluorobutyl ether (EFE), 2-trifluoromethyl-3-methoxyperfluoropentane (TMMP), 2-(trifluoro-2-fluoro-3-difluoropropoxy)-3-difluoro-4-fluoro-5-trifluoropentane (TPTP); Diethers: 1,2-dimethoxyethane (DME), 2,2-bis(trifluoromethyl)-1,3-dioxolane, 2,2-dimethyl-4,5-difluoro-1,3-dioxolane, 2,2-dimethyl-4,4,5,5-tetrafluoro-1,3-dioxolane, 2-fluoroethoxymethoxyethane (FEME), 2,2-difluoroethoxymethoxyethane (DFEME), methoxy-2,2,2-trifluoroethoxyethane (TFEME), ethoxy-2-fluoroethoxyethane (EFEE), 2,2-difluoroethoxyethoxyethane (EDFEE), and ethoxy-2,2, 2-trifluoroethoxyethane (ETFEE). These compounds may serve as additives or as co-solvents.

Non-fluorinated solvents that may be included in the electrolyte composition include, but are not limited to, one or more of EC (ethylene carbonate), PC (propylene carbonate), EMC (ethyl methyl carbonate), DMC (dimethyl carbonate), DEC (diethyl carbonate), GBL (gamma butyrolactone), MA (methyl acetate), EA (ethyl acetate), t-BC (trans-butylene carbonate), PMC (propyl methyl carbonate), DME (dimethoxyethane), EME (ethoxymethoxyethane), methyl propanoate and/or DEE (diethoxyethane).

In some embodiments, the electrolyte contains FEC. In further embodiments, the electrolyte contains both EMC and FEC. In some embodiments, the electrolyte may further contain 1,1,2,2-tetrafluoroethyl 2,2,3,3-tetrafluoropropyl ether, EC, DEC, DMC, PC, GBL, and/or F2EC or some partially or fully fluorinated linear or cyclic carbonates, ethers, etc. as a co-solvent. In some embodiments, the electrolyte is free or substantially free of non-fluorine-containing cyclic carbonates, such as EC, GBL, and PC.

In further embodiments, electrolyte solvents may be composed of a cyclic carbonate, such as fluoroethylene carbonate (FEC), di-fluoroethylene carbonate (DiFEC), Trifluoropropylene carbonate (TFPC), ethylene carbonate (EC), propylene carbonate (PC), etc; a linear carbonate, such as dimethyl carbonate (DMC), diethyl carbonate (DEC), ethyl methyl carbonate (EMC), Dimethyl sulfite (DMS), etc; or other solvents, such as methyl acetate, ethyl acetate, or gamma butyrolactone, dimethoxyethane, 1,1,2,2-tetrafluoroethyl 2,2,3,3-tetrafluoropropyl ether, etc. In some embodiments, a linear carbonate such as EMC is the main component (greater than 50%) of the electrolyte composition. In some embodiments, EMC may be present in the electrolyte composition in an amount of 65-95% by weight; in further embodiments, EMC may be present in the electrolyte composition in an amount of 70-90% by weight.

In some embodiments, the electrolyte composition may comprise a system of solvents (i.e. a solvent, plus one or more co-solvents). The solvents may be fluorinated or non-fluorinated. In some embodiments, the co-solvents may be one or more linear carbonates, lactones, acetates, propanoates and/or non-linear carbonates. In some embodiments, the co-solvents may be one or more carbonate solvents, such as one or more linear carbonates and/or non-linear carbonates, as discussed above. In other embodiments, linear carbonates may be added in smaller amounts as an additive. In some embodiments, an electrolyte composition may comprise one or more of EMC at a concentration of 5% or more; and/or FEC at a concentration of 5% or more.

In some embodiments, the solvents in the electrolyte composition include, but are not limited to, one or more of ethyl methyl carbonate (EMC), methyl acetate, dimethyl carbonate (DMC), diethyl carbonate (DEC), gamma butyrolactone, methyl acetate (MA), ethyl acetate (EA), methyl propanoate, fluoro ethylene carbonate (FEC), di-fluoroethylene carbonate (DiFEC), Trifluoropropylene carbonate (TFPC), ethylene carbonate (EC), vinylene carbonate (VC) or propylene carbonate (PC).

As used herein, a co-solvent of an electrolyte has a concentration of at least about 10% by volume (vol %). In some embodiments, a co-solvent of the electrolyte may be about 20 vol %, about 40 vol %, about 60 vol %, or about 80 vol %, or about 90 vol % of the electrolyte. In some embodiments, a co-solvent may have a concentration from about 10 vol % to about 90 vol %, from about 10 vol % to about 80 vol %, from about 10 vol % to about 60 vol %, from about 20 vol % to about 60 vol %, from about 20 vol % to about 50 vol %, from about 30 vol % to about 60 vol %, or from about 30 vol % to about 50 vol %. These percentages also may be expressed by weight of the solvent.

For example, in some embodiments, the electrolyte may contain a fluorine-containing cyclic carbonate, such as FEC, at a concentration of about 10 vol % to about 60 vol %, including from about 20 vol % to about 50 vol %, from about 20 vol % to about 40 vol %, from about 5 vol % to about 30 vol %, and from about 10 vol % to about 30 vol %. These percentages also may be expressed by weight of the solvent. In some embodiments, the electrolyte may comprise a linear carbonate that does not contain fluorine, such as EMC, at a concentration of about 40 vol % to about 90 vol %, including from about 50 vol % to about 80 vol %, and from about 60 vol % to about 80 vol %. In some embodiments, the electrolyte may comprise 1,1,2,2-tetrafluoroethyl 2,2,3,3-tetrafluoropropyl ether at a concentration of from about 10 vol % to about 30 vol %, including from about 10 vol % to about 20 vol %. These percentages also may be expressed by weight of the solvent.

In some embodiments, the electrolyte is substantially free of cyclic carbonates other than fluorine-containing cyclic carbonates (i.e., non-fluorine-containing cyclic carbonates). Examples of non-fluorine-containing carbonates include EC, PC, GBL, and vinylene carbonate (VC).

In some embodiments, the electrolyte may further comprise one or more additives. As used herein, an additive of the electrolyte refers to a component that makes up less than 10% by weight (wt %) of the electrolyte. In some embodiments, the amount of each additive in the electrolyte may be from about 0.2 wt % to about 1 wt %, from about 0.1 wt % to about 2 wt %, from about 0.5 wt % to about 2 wt %, from about 0.2 wt % to about 9 wt %, from about 0.5 wt % to about 9 wt %, from about 1 wt % to about 9 wt %, from about 1 wt % to about 8 wt %, from about 1 wt % to about 8 wt %, from about 1 wt % to about 7 wt %, from about 1 wt % to about 6 wt %, from about 1 wt % to about 5 wt %, from about 2 wt % to about 5 wt %, or any value in between. In some embodiments, the total amount of the additive(s) may be from about 1 wt % to about 9 wt %, from about 1 wt % to about 8 wt %, from about 1 wt % to about 7 wt %, from about 2 wt % to about 7 wt %, or any value in between. In another embodiment, the In other embodiments, the percentages of additives may be expressed in volume percent (vol %).

Additives include, but are not limited to, one or more of VC (vinylene carbonate), PS (1,3-propane sultone), PES (prop-1-ene-1,3-sultone), MMDS (methylene methanedisulfonate), TMSP (tris(trimethylsilyl)phosphite), TMS (trimethylene sulfate), TMSO (3-trimethylsilyl-2-oxazolidinone), 1,4-BS (1,4-butane sultone), PMS (propargyl methanesulfonate), BP (biphenyl), MTMS (methyl trimethylene sulfate), MBP (methyl biphenyl), ES (ethylene sulfite), DTD (1,3,2-Dioxathiolane 2,2-dioxide), BS (butane sultone), SN (succinonitrile) and/or AN (adiponitrile). Additives can also include phosphazenes, including but not limited to ethoxy (pentafluoro)cyclotriphosphazene, hexamethoxycyclotriphosphazene, hexapropioxycyclotriphosphazene, and hexafuluoroethoxycyclotriphosphazene. Other additives may include organosilicon compounds. Organosilicon compounds generally include any compound containing both Si and C and include, but are not limited to silanols, siloxides, siloxanes, silyl ethers, silyl chlorides, silyl hydrides, silenes, siloles, and/or fluorinated organosilicons.

In some embodiments, salts may be included in the electrolyte compositions. A lithium-containing salt for a lithium-ion battery may comprise a fluorinated or non-fluorinated salt. In further embodiments, a lithium-containing salt for a lithium-ion battery may comprise one or more of lithium hexafluorophosphate ($LiPF_6$), lithium tetrafluoroborate ($LiBF_4$), lithium hexafluoroarsenate monohydrate ($LiAsF_6$), lithium perchlorate ($LiClO_4$), lithium bis(trifluoromethanesulfonyl)imide (LiTFSI), lithium bis(fluorosulfonyl)imide (LiFSI), lithium bis(oxalato)borate (LiBOB), lithium difluoro(oxalate)borate (LiDFOB), lithium triflate ($LiCF_3SO_3$), lithium tetrafluorooxalato phosphate (LTFOP), lithium difluorophosphate ($LiPO_2F_2$), lithium pentafluoroethyltrifluoroborate (LiFAB), and lithium 2-trifluoromethyl-4,5-dicyanoimidazole (LiTDI), lithium bis(2-fluoromalonato)borate (LiBFMB), lithium 4-pyridyl trimethyl borate (LPTB), lithium 2-fluorophenol trimethyl borate (LFPTB), lithium catechol dimethyl borate (LiCDMB), lithium tetrafluorooxalatophosphate (LiFOP), etc. or combinations thereof. In certain embodiments, a lithium-containing salt for a lithium-ion battery may comprise lithium hexafluorophosphate ($LiPF_6$). In some embodiments, the electrolyte can have a salt concentration of about 1 moles/L (M). In other embodiments, the salt concentration can be higher than 1 M; in further embodiments, the salt concentration can be higher than 1.2 M, or up to 5 M. In some embodiments, the electrolyte composition may include one or more lithium salts at 0.5 M-5 M, 1 M-3 M, or 1.2 M-2.0 M. Salts can be used in smaller amounts and may be classified as an additive.

In further embodiments, two or more salts, or three or more salts are included in the electrolyte composition. In one embodiment, two salts are included; in another embodiment, three salts are included.

In the present disclosure, electrolyte formulations are disclosed to address thermal stability and enable commercially-viable performance for Si-containing cells. Electrolyte formulations as described herein are electrolyte compositions comprising two or more components such as solvents, co-solvents, salts and/or additives. In some embodiments, three or more, four or more, or five or more components are included in the electrolyte composition. In certain embodiments, the electrolyte composition includes a salt component, solvent component and additive component. The salt component may comprise one or more lithium salts at 0.5 M-5 M, or more preferably 1 M-3 M, or even more preferably 1.2 M-2.0 M. The solvent component may comprise 2-100 wt % fluorinated solvents, or more preferably 10-50 wt %, or even more preferably 15-30 wt %; and 0-98 wt % non-fluorinated solvents, or 50-90 wt %, or 60-80 wt %. The additive component may comprise one or more additives comprising a total of 0-10 wt % of the total electrolyte composition, or more preferably 0.5-7 wt %, or even more preferably 1-5 wt %. In one embodiment, the electrolyte composition contains two or more lithium salts, 10-50 wt % of one or more fluorinated solvents, 50-90 wt % of one or more non-fluorinated solvents, and one or more additives comprising a total of 0-10 wt % of the total electrolyte composition. In some embodiments, the balance of the electrolyte composition can be a linear carbonate.

As disclosed herein, the inclusion of two or more salts in the electrolyte composition achieves a balance of high temperature stability, conductivity, and film formation on the metal (e.g., aluminum) current collector and the electrodes. In some embodiments, the combination of $LiPF_6$, LiFSI and/or LiTFSI salts are used together at concentrations of about 0.1-2.0 M each, or more preferably 0.4-1.0 M each. This combination of salts may exert a positive effect on cell performance, such as lower the DCIR during cycling. It is believed that the salts work synergistically together to improve electrode/electrolyte interface behavior. In one embodiment, $LiPF_6$, LiFSI and LiTFSI salts are used together at concentrations of about 0.1-2.0 M each; in a further embodiment, $LiPF_6$, LiFSI and LiTFSI salts are used together at concentrations of about 0.4-1.0 M each.

In further embodiments, $LiPO_2F_2$ may be utilized (alone or with other salts) to provide improved conductivity of the films formed on both the anode and the cathodes. In other embodiments, LiDFOB may be added to improve thermal stability and the anode SEI. $LiPO_2F_2$ may be added in small amounts (e.g., between 0-2 wt %; or between 1-2 wt %) and considered an additive.

When the electrolyte composition comprises a combination of two or more salts, not having EC is preferred due to EC causing a poorly conductive SEI on the anode, which leads to poor cycle life performance. Thus in an embodiment, the electrolyte composition does not include EC.

In an additional embodiment, the electrolyte composition may have PC combined with FEC as solvents. This combination is beneficial due to the modification of the anode SEI and the thermal stability of PC. PC may be included in amounts of 5-20% by weight; in certain embodiments PC is included in amounts of 10-20% by weight.

In a further embodiment, the electrolyte composition may have FEC, PC and/or EC each between 0 and 30 percent, or between 10 and 30 percent by weight.

In a further embodiment, FB can be added to the electrolyte composition as a co-solvent to increase wettability, lower viscosity, and increase electrolyte solution conductivity, without creating high temperature stability issues, as with other diluents (co-solvents) such as DMC. FB may be included in amounts of 5-20% by weight; in certain embodiments FB is included in amounts of 10-20% by weight.

In other embodiments, sulfur-containing (sulfur-based) additives may be utilized in the electrolyte composition due to their ability to form protective films on both the anode and the cathode. Sulfur-containing (sulfur-based) additives may include sultones, sulfonates, sulfates and thiols. Sulfur-containing additives include, but are not limited to, PS (1,3-propane sultone), PES (prop-1-ene-1,3-sultone), MMDS (methylene methanedisulfonate), TMS (trimethylene sulfate), 1,4-BS (1,4-butane sultone), PMS (propargyl methanesulfonate), and DTD (1,3,2-Dioxathiolane 2,2-dioxide).

In a further embodiment, phosphazene can be added to the electrolyte composition to improve thermal stability on the cathode's surface, reducing the cell resistance growth at high temperature. Phosphazenes include but are not limited to Ethoxy(pentafluoro)cyclotriphosphazene, hexamethoxycyclotriphosphazene, hexapropioxycyclotriphosphazene, and hexafuluoroethoxycyclotriphosphazene.

The term "alkyl" refers to a straight or branched, saturated, aliphatic radical having the number of carbon atoms indicated. The alkyl moiety may be branched or straight chain. For example, C1-C6 alkyl includes, but is not limited to, methyl, ethyl, propyl, isopropyl, butyl, isobutyl, sec-butyl, tert-butyl, pentyl, isopentyl, hexyl, etc. Other alkyl groups include, but are not limited to heptyl, octyl, nonyl, decyl, etc. Alkyl can include any number of carbons, such as 1-2, 1-3, 1-4, 1-5, 1-6, 1-7, 1-8, 1-9, 1-10, 1-11, 1-12 2-3, 2-4, 2-5, 2-6, 3-4, 3-5, 3-6, 4-5, 4-6 and 5-6. The alkyl group is typically monovalent, but can be divalent, such as when the alkyl group links two moieties together.

The term "fluoro-alkyl" refers to an alkyl group where one, some, or all hydrogen atoms have been replaced by fluorine.

The term "alkylene" refers to an alkyl group, as defined above, linking at least two other groups, i.e., a divalent hydrocarbon radical. The two moieties linked to the alkylene can be linked to the same atom or different atoms of the alkylene. For instance, a straight chain alkylene can be the bivalent radical of —(CH$_2$)$_n$—, where n is 1, 2, 3, 4, 5, 6, 7, 8, 9, or 10. Alkylene groups include, but are not limited to, methylene, ethylene, propylene, isopropylene, butylene, isobutylene, sec-butylene, pentylene and hexylene.

The term "alkoxy" refers to alkyl group having an oxygen atom that either connects the alkoxy group to the point of attachment or is linked to two carbons of the alkoxy group. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. For example, the alkoxy groups can be substituted with halogens to form a "halo-alkoxy" group, or substituted with fluorine to form a "fluoro-alkoxy" group.

The term "alkenyl" refers to either a straight chain or branched hydrocarbon of 2 to 6 carbon atoms, having at least one double bond. Examples of alkenyl groups include, but are not limited to, vinyl, propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can also have from 2 to 3, 2 to 4, 2 to 5, 3 to 4, 3 to 5, 3 to 6, 4 to 5, 4 to 6 and 5 to 6 carbons. The alkenyl group is typically monovalent, but can be divalent, such as when the alkenyl group links two moieties together.

The term "alkenylene" refers to an alkenyl group, as defined above, linking at least two other groups, i.e., a divalent hydrocarbon radical. The two moieties linked to the alkenylene can be linked to the same atom or different atoms of the alkenylene. Alkenylene groups include, but are not limited to, ethenylene, propenylene, isopropenylene, butenylene, isobutenylene, sec-butenylene, pentenylene and hexenylene.

The term "alkynyl" refers to either a straight chain or branched hydrocarbon of 2 to 6 carbon atoms, having at least one triple bond. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. Alkynyl groups can also have from 2 to 3, 2 to 4, 2 to 5, 3 to 4, 3 to 5, 3 to 6, 4 to 5, 4 to 6 and 5 to 6 carbons. The alkynyl group is typically monovalent, but can be divalent, such as when the alkynyl group links two moieties together.

The term "alkynylene" refers to an alkynyl group, as defined above, linking at least two other groups, i.e., a divalent hydrocarbon radical. The two moieties linked to the alkynylene can be linked to the same atom or different atoms of the alkynylene. Alkynylene groups include, but are not limited to, ethynylene, propynylene, butynylene, sec-butynylene, pentynylene, and hexynylene.

The term "cycloalkyl" refers to a saturated or partially unsaturated, monocyclic, fused bicyclic, bridged polycyclic, or spiro ring assembly containing from 3 to 12, from 3 to 10, or from 3 to 7 ring atoms, or the number of atoms indicated. Monocyclic rings include, for example, cyclopropyl, cyclobutyl, cyclopentyl, cyclohexyl, and cyclooctyl. Bicyclic and polycyclic rings include, for example, norbornane, decahydronaphthalene and adamantane. For example, C3-C8 cycloalkyl includes cyclopropyl, cyclobutyl, cyclopentyl, cyclohexyl, cyclooctyl, and norbornane. As used herein, the term "fused" refers to two rings which have two atoms and one bond in common. For example, in the following structure, rings A and B are fused

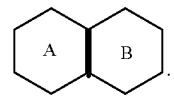

As used herein, the term "bridged polycyclic" refers to compounds wherein the cycloalkyl contains a linkage of one or more atoms connecting non-adjacent atoms. The following structures

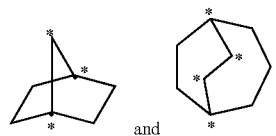 [SMILES: C1CC2CCC1C2 ; C1CC2CCC(C1)CC2]

are examples of "bridged" rings. As used herein, the term "spiro" refers to two rings that have one atom in common and the two rings are not linked by a bridge. Examples of fused cycloalkyl groups are decahydronaphthalenyl, dodecahydro-1H-phenalenyl and tetradecahydroanthracenyl; examples of bridged cycloalkyl groups are bicyclo[1.1.1]pentyl, adamantanyl, and norbornanyl; and examples of spiro cycloalkyl groups include spiro[3.3]heptane and spiro[4.5]decane.

The term "cycloalkylene" refers to a cycloalkyl group, as defined above, linking at least two other groups, i.e., a divalent hydrocarbon radical. The two moieties linked to the cycloalkylene can be linked to the same atom or different atoms of the cycloalkylene. Cycloalkylene groups include, but are not limited to, cyclopropylene, cyclobutylene, cyclopentylene, cyclohexylene, and cyclooctylene.

The term "aryl" refers to a monocyclic or fused bicyclic, tricyclic or greater, aromatic ring assembly containing 6 to 16 ring carbon atoms. For example, aryl may be phenyl, benzyl or naphthyl, preferably phenyl. Aryl groups may include fused multicyclic ring assemblies wherein only one ring in the multicyclic ring assembly is aromatic. Aryl groups can be mono-, di-, or tri-substituted by one, two or three radicals. Preferred as aryl is naphthyl, phenyl, or phenyl mono- or disubstituted by alkoxy, phenyl, halogen, alkyl or trifluoromethyl, especially phenyl or phenyl-mono- or disubstituted by alkoxy, halogen or trifluoromethyl, and in particular phenyl.

The term "arylene" refers to an aryl group, as defined above, linking at least two other groups. The two moieties linked to the arylene are linked to different atoms of the arylene. Arylene groups include, but are not limited to, phenylene.

The term "heteroaryl" refers to a monocyclic or fused bicyclic or tricyclic aromatic ring assembly containing 5 to 16 ring atoms, where from 1 to 4 of the ring atoms are a heteroatom such as N, O, or S. For example, heteroaryl includes pyridyl, indolyl, indazolyl, quinoxalinyl, quinolinyl, isoquinolinyl, benzothienyl, benzofuranyl, furanyl, pyrrolyl, thiazolyl, benzothiazolyl, oxazolyl, isoxazolyl, triazolyl, tetrazolyl, pyrazolyl, imidazolyl, thienyl, or any other radicals substituted, especially mono- or di-substituted, by e.g. alkyl, nitro or halogen. Pyridyl represents 2-, 3- or 4-pyridyl, advantageously 2- or 3-pyridyl. Thienyl represents 2- or 3-thienyl. Quinolinyl represents preferably 2-, 3- or 4-quinolinyl. Isoquinolinyl represents preferably 1-, 3- or 4-isoquinolinyl. Benzopyranyl, benzothiopyranyl represents preferably 3-benzopyranyl or 3-benzothiopyranyl, respectively. Thiazolyl represents preferably 2- or 4-thiazolyl, and most preferred 4-thiazolyl. Triazolyl is preferably 1-, 2- or 5-(1,2,4-triazolyl). Tetrazolyl is preferably 5-tetrazolyl.

Preferably, heteroaryl is pyridyl, indolyl, quinolinyl, pyrrolyl, thiazolyl, isoxazolyl, triazolyl, tetrazolyl, pyrazolyl, imidazolyl, thienyl, furanyl, benzothiazolyl, benzofuranyl, isoquinolinyl, benzothienyl, oxazolyl, indazolyl, or any of the radicals substituted, especially mono- or di-substituted.

The term "heteroalkyl" refers to an alkyl group having from 1 to 3 heteroatoms such as N, O and S. The heteroatoms can also be oxidized, such as, but not limited to, —S(O)— and —S(O)$_2$—. For example, heteroalkyl can include ethers, thioethers, alkyl-amines and alkyl-thiols.

The term "heteroalkylene" refers to a heteroalkyl group, as defined above, linking at least two other groups. The two moieties linked to the heteroalkylene can be linked to the same atom or different atoms of the heteroalkylene.

The term "heterocycloalkyl" refers to a ring system having from 3 ring members to about 20 ring members and from 1 to about 5 heteroatoms such as N, O and S. The heteroatoms can also be oxidized, such as, but not limited to, —S(O)— and —S(O)$_2$—. For example, heterocycle includes, but is not limited to, tetrahydrofuranyl, tetrahydrothiophenyl, morpholino, pyrrolidinyl, pyrrolinyl, imidazolidinyl, imidazolinyl, pyrazolidinyl, pyrazolinyl, piperazinyl, piperidinyl, indolinyl, quinuclidinyl and 1,4-dioxa-8-aza-spiro[4.5]dec-8-yl.

The term "heterocycloalkylene" refers to a heterocyclalkyl group, as defined above, linking at least two other groups. The two moieties linked to the heterocycloalkylene can be linked to the same atom or different atoms of the heterocycloalkylene.

The term "optionally substituted" is used herein to indicate a moiety that can be unsubstituted or substituted by one or more substituent. When a moiety term is used without specifically indicating as substituted, the moiety is unsubstituted.

In the present disclosure, electrolyte formulations are disclosed to address thermal stability and enable commercially-viable performance for Si-containing cells. Electrolyte formulations as described herein are electrolyte compositions comprising two or more components such as solvents, co-solvents, salts and/or additives. These electrolyte compositions can provide one or more of the following improvements: (1) Improve cycle life of cells; (2) Reduce gassing at high temperatures; (3) Reduce impedance growth during cycling; (4) Reduce DCIR growth during storage at high temperatures; and/or (5) Improve capacity retention during high temperature storage.

An energy storage device is described comprising a first electrode and a second electrode (wherein at least one of the first electrode and the second electrode may be a Si-based electrode); a separator between the first electrode and the second electrode; and an electrolyte composition as described herein. In some embodiments, the electrolyte composition comprises two or more lithium salts, 10-50 wt % of one or more fluorinated solvents, 50-90 wt % of one or more non-fluorinated solvents, and one or more additives comprising a total of 0-10 wt % of the total electrolyte composition. In a further embodiment, the two or more lithium salts have a total molarity between 1 and 2, or between 1.2 and 1.6 M. In certain embodiments, exactly two or exactly three lithium salts may be included. In other embodiments, four lithium salts may be included. In some embodiments, the salt may be one or more of LiBF$_4$, LiFSI, LiTFSI and LiPF$_6$. In further embodiments, the salt may be LiTFSI and LiPF$_6$; or may be LiFSI and LiPF$_6$.

The following embodiments illustrate electrolyte compositions that provide benefits to Si-containing cells. Unless otherwise noted, percentages are in weight percent.

Embodiment 1

An electrolyte composition comprising:
a. A combination of two salts, LiTSI and LiPF$_6$; added with a total molarity of between 1 M and 2 M, or between 1.2 M and 1.6 M
b. FEC or PC or both, between 0 and 30 percent, or between 10 and 30 percent
c. FB between 0 and 20 percent
d. 1-3 other additives between 0.25-1.5%
e. The balance being a linear carbonate Embodiment 2

An electrolyte composition comprising:
a. A combination of LiPF$_6$ with one or two other salts selected from LiFSI and LiTFSI; added with a total molarity of between 1 M and 2 M, or between 1.2 and 1.6 M
b. FEC, PC and/or EC each between 0 and 30 percent, or between 10 and 30 percent
c. FB between 0 and 20 percent
d. 1-3 other additives between 0.25-1.5%
e. The balance being a linear carbonate Embodiment 3

An electrolyte composition comprising:
a. A combination of LiPF$_6$ with one or two other salts selected from LiFSI and LiTFSI; added with a total molarity of between 1 M and 2 M, or between 1.2 and 1.6 M
b. FEC, PC and/or EC each between 0 and 30 percent, or between 10 and 30 percent
c. FB between 0 and 20 percent
d. 1-3 other additives between 0.25-1.5% where there is a sulfur-containing additive
e. The balance being a linear carbonate Embodiment 4

An electrolyte composition comprising:
a. A combination of two salts, LiFSI and LiPF$_6$; added with a total molarity of between 1 M and 2 M, or between 1.2 and 1.6 M
b. FEC and PC both between 0 and 30 percent, or between 10 and 30 percent
c. FB between 0 and 20 percent
d. 1-3 other additives between 0.25-1.5% where there is a sulfur-containing additive
e. The balance being a linear carbonate Embodiment 5

An electrolyte composition comprising:
a. A combination of two salts, LiFSI and LiPF$_6$; added with a total molarity of between 1 and 2, or between 1.2 and 1.6 M b. FEC and PC both between 0 and 30 percent, or between 10 and 30 percent
c. FB between 0 and 20 percent
d. 1-3 other additives between 0.25-1.5% where at least one of the additives is one of DTD (1,3,2-Dioxathiolane 2,2-dioxide), PS (1,3-propane sultone), PES (prop-1-ene-1,3-sultone), 1,4-BS (1,4-butane sultone), MMDS (methylene methanedisulfonate), TMSO (3-trimethylsilyl-2-oxazolidinone), PMS (propargyl methanesulfonate), MTMS (methyl trimethylene sulfate)
e. The balance being a linear carbonate Embodiment 6

An electrolyte composition comprising:
a. A combination of two salts, LiFSI and LiPF$_6$; added with a total molarity of between 1 and 2, or between 1.2 and 1.6 M
b. FEC and PC both between 0 and 30 percent, or between 10 and 30 percent
c. FB between 0 and 20 percent
d. 1-3 other additives between 0.25-1.5% where at least one of the additives is a sultone, such as PS (1,3-propane sultone) or —BS (1,4-butane sultone)
e. The balance being a linear carbonate Embodiment 7

An electrolyte composition comprising:
a. A combination of two salts, LiFSI and LiPF$_6$; added with a total molarity of between 1 and 2, or between 1.2 and 1.6 M
b. FEC and PC both between 0 and 30 percent, or between 10 and 30 percent
c. FB between 0 and 20 percent
d. 1-3 other additives between 0.25-1.5% where at least one of the additives is one of PS (1,3-propane sultone), PES (prop-1-ene-1,3-sultone), TMSO (3-trimethylsilyl-2-oxazolidinone)
e. The balance being a linear carbonate Embodiment 8

An electrolyte composition comprising:
a. A combination of two salts, LiFSI and LiPF$_6$; added with a total molarity of between 1 and 2, or between 1.2 and 1.6 M
b. FEC and PC both between 0 and 30 percent, or between 10 and 30 percent
c. FB between 0 and 20 percent
d. 1-3 other additives between 0.25-1.5% where at least one of the additives is a sulfonate, where sulfonate (SO3R) can include PS (1,3-propane sultone), PES (prop-1-ene-1,3-sultone), BS (1,4-butane sultone), MMDS methylene methanedisulfonate
e. The balance being a linear carbonate Embodiment 9

An electrolyte composition comprising:
a. A combination of two salts, LiFSI and LiPF$_6$; added with a total molarity of between 1 M and 2 M, or between 1.2 and 1.6 M
b. FEC and PC both between 0 and 30 percent, or between 10 and 30 percent
c. FB between 0 and 20 percent
d. 1-3 other additives between 0.25-1.5% where at least one of the additives is one of MMDS (methylene methanedisulfonate) or PMS (propargyl methanesulfonate),
e. The balance being a linear carbonate Embodiment 10

An electrolyte composition comprising:
a. A combination of three salts, LiFSI, LiTFSI and LiPF$_6$; added with a total molarity of between 1 M and 2 M, or between 1.2 M and 1.6 M
b. FEC between 0 and 30 percent, or between 10 and 30 percent
c. EMC between 70 and 90 percent Embodiment 11

An electrolyte composition comprising:
a. A combination of LiTFSI, LiFSI, LiPF$_6$, and/or LiBF$_4$ with a total molarity between 0.8 M and 2 M
b. FEC between 5-30%
c. EMC between 70-95%
d. Additives between 0-2% where the additives are PES (prop-1-ene-1,3-sultone), DTD (1,3,2-Dioxathiolane 2,2-dioxide and/or LiPO$_2$F$_2$ Any of Embodiments 1-11 above may be utilized in cells containing silicon (Si) and, more particularly, with a silicon dominant anode, that is, an electrode with more than 50% Si as an active material. Further, Embodiments 1-11 above may be particularly useful for cells containing high nickel cathodes, such as NCM523, NCM622, NCM811, NCA, NCMA or other similar materials.

The electrolyte composition described herein may be advantageously utilized within an energy storage device. In some embodiments, energy storage devices may include batteries, capacitors, and battery-capacitor hybrids. In some embodiments, the energy storage device comprises lithium. In some embodiments, the energy storage device may comprise at least one electrode, such as an anode and/or cathode. In some embodiments, at least one electrode may be a Si-based electrode. In some embodiments, the Si-based electrode is a Si-dominant electrode, where silicon is the majority of the active material used in the electrode (e.g., greater than 50% silicon). In some embodiments, the energy storage device comprises a separator. In some embodiments, the separator is between a first electrode and a second electrode.

In some embodiments, the amount of silicon in the electrode material (active material) includes between about 30% and about 95% by weight, between about 50% and about 85% by weight, and between about 75% and about 95% by weight. In other embodiments, the amount of silicon in the electrode material may be at least about 30% by weight; greater than 0% and less than about 95% by weight; or between about 50% and about 95% by weight. In some embodiments, the electrode is silicon dominant (>50% silicon); in other embodiments, the amount of silicon is 70% or more. Furthermore, the silicon particles may or may not be pure silicon. For example, the silicon particles may be substantially silicon or may be a silicon alloy. In one embodiment, the silicon alloy includes silicon as the primary constituent along with one or more other elements.

In some aspects, energy storage devices such as batteries are provided. In some embodiments, the energy storage device includes a first electrode and a second electrode, wherein at least one of the first electrode and the second electrode is a Si-based electrode. In some embodiments, the energy storage device includes a separator between the first electrode and the second electrode. In some embodiments, the energy storage device includes an electrolyte, which may be provided as an electrolyte composition as described herein.

In some embodiments, the second electrode is a Si-dominant electrode. In some embodiments, the second electrode comprises a self-supporting composite material film. In some embodiments, the composite material film comprises greater than 0% and less than about 95% by weight of silicon particles, and greater than 0% and less than about 90% by weight of one or more types of carbon phases, wherein at least one of the one or more types of carbon phases is a substantially continuous phase that holds the composite material film together such that the silicon particles are distributed throughout the composite material film.

In some embodiments, the battery may be capable of at least 200 cycles with more than 80% cycle retention when cycling with a C-rate of >2 C cycling between an upper voltage of >4V and a lower cut-off voltage of <3.3V. In other embodiments, the battery may be capable of at least 200 cycles with more than 80% cycle retention when cycling with a C-rate of >2 C cycling between an upper voltage of >4V and a lower cut-off voltage of <3.3V.

Example devices and processes for device fabrication are generally described below, and the performances of lithium-ion batteries with different electrode compositions may be evaluated.

Figure 5:
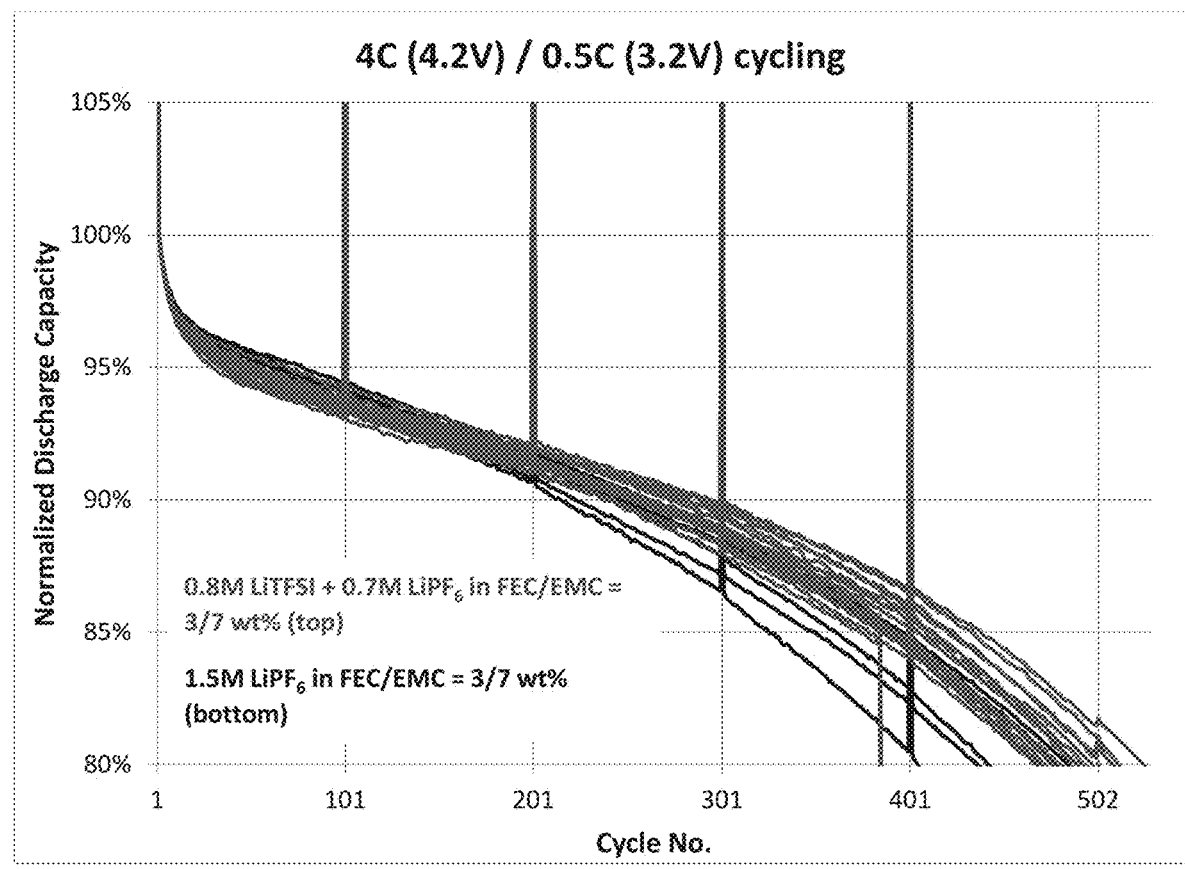
FIG. 5 shows cycle life of 2 types of electrolyte compositions during 4 C (4.2V)/0.5 C (3.2V) cycling at RT, in accordance with an example embodiment of the disclosure.

FIG. 5 shows that a dual salt electrolyte composition containing both $LiPF_6$ and LiTFSI improves cycle life of the cell as compared to an electrolyte that only contains $LiPF_6$. The anode may be a continuous anode containing 90% Si and 10% pyrolytic carbon. The cathode may be a NCM811 cathode containing 92% active material, 4% conductive carbon and 4% binder. Electrolyte compositions are Black/bottom: 1.5 M $LiPF_6$ in FEC/EMC=3/7 wt %; Red/top: 0.8 M LiTFSI+0.7 M $LiPF_6$ in FEC/EMC=3/7 wt %. Cycling test: 4 C charge to 4.2V until C/20, and 0.5 C discharge to 3.2V for normal cycles; 0.3 C charge to 4.2V until C/20, and 0.3 C discharge to 3V every 100 cycles.

Figure 6:
FIG. 6 shows photos of cells containing 2 types of electrolyte compositions after 4 C (4.2V)/0.5 C (3.2V) cycling at 45° C., in accordance with an example embodiment of the disclosure.

FIG. 6 shows that cells containing FEC and PC electrolyte have no gassing after 4 C (4.2V)/0.5 C (3.2V) cycling at 45° C.; whereas cells only containing FEC electrolyte have some gassing after 4 C (4.2V)/0.5 C (3.2V) cycling at 45° C. The anode may contain 86% Si, 4% conductive carbon and 10% pyrolytic carbon. The cathode may be a NCM811 cathode with 92% active material, 4% conductive carbon and 4% binder. Cycling test: 4 C charge to 4.2V until C/20, and 0.5 C discharge to 3.2V at 45° C. Electrolyte containing FEC and PC also has less gassing than electrolyte containing only FEC after 60° C. storage for 4 weeks. FIG. 6 specifically shows photos of cells containing 2 types of electrolyte compositions after 4 C (4.2V)/0.5 C (3.2V) cycling at 45° C. Left: 0.8 M LiFSI+0.7 M $LiPF_6$ in FEC/EMC/FB=25/65/10 wt %+1% phosphazene+0.5% LiDFOB; Right: 0.8 M LiFSI+0.7 M $LiPF_6$ in FEC/PC/EMC/FB=15/10/65/10 wt %+1% phosphazene+0.5% LiDFOB.

Figure 7:
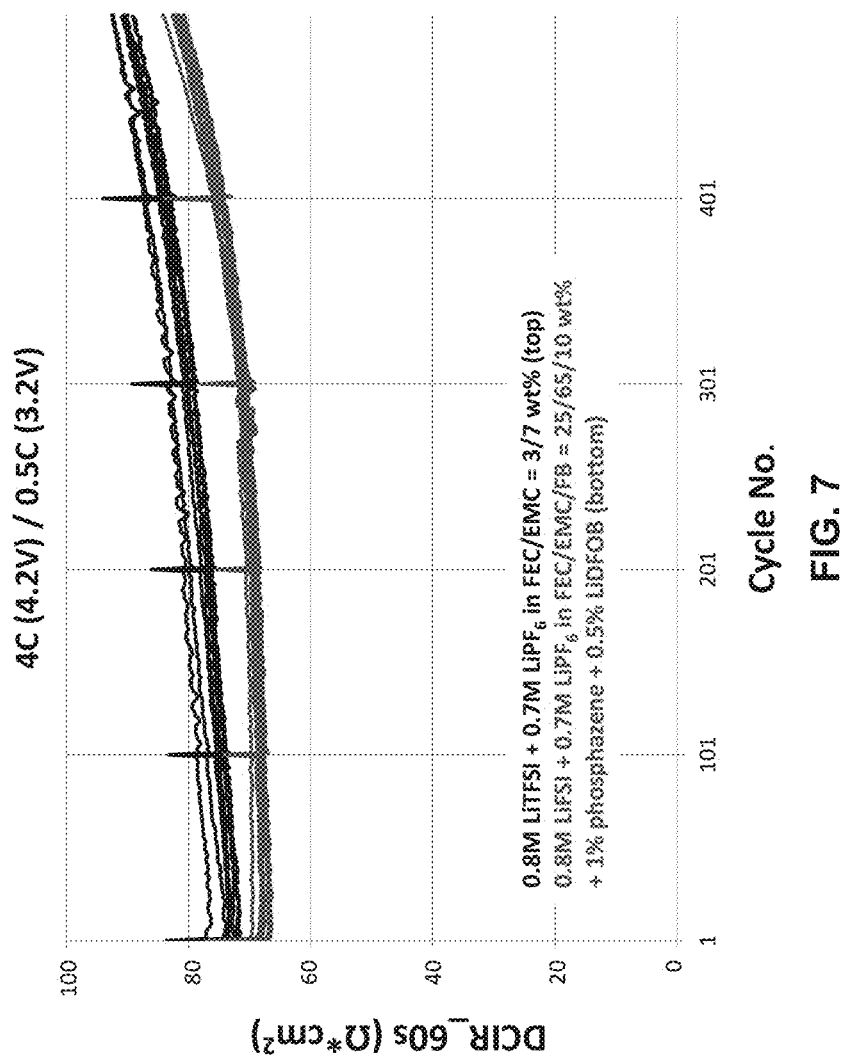
FIG. 7 shows the DCIR (60 s) of 2 types of electrolyte compositions during 4 C (4.2V)/0.5 C (3.2V) cycling at RT, in accordance with an example embodiment of the disclosure.

FIG. 7 shows the DCIR (60 s) during 4 C (4.2V)/0.5 C (3.2V) cycling, and illustrates that cells with LiFSI, FB, phosphazene and LiDFOB have lower DCIR during cycling as compared to cells with LiTFSI and no additives. The anode may be a continuous anode containing 86% Si, 4% conductive carbon and 10% pyrolytic carbon. The cathode may be a NCM811 cathode with 92% active material, 4% conductive carbon and 4% binder. Cycling test: 4 C charge to 4.2V until C/20, and 0.5 C discharge to 3.2V for normal cycles; 0.3 C charge to 4.2V until C/20, and 0.3 C discharge to 3V every 100 cycles. FIG. 7 specifically shows the DCIR (60 s) of 2 types of electrolyte compositions during 4 C (4.2V)/0.5 C (3.2V) cycling at RT. Black/top: 0.8 M LiTFSI+0.7 M $LiPF_6$ in FEC/EMC=3/7 wt %; Red/bottom: 0.8 M LiFSI+0.7 M $LiPF_6$ in FEC/EMC/FB=25/65/10 wt %+1% phosphazene+0.5% LiDFOB.

Figure 8:
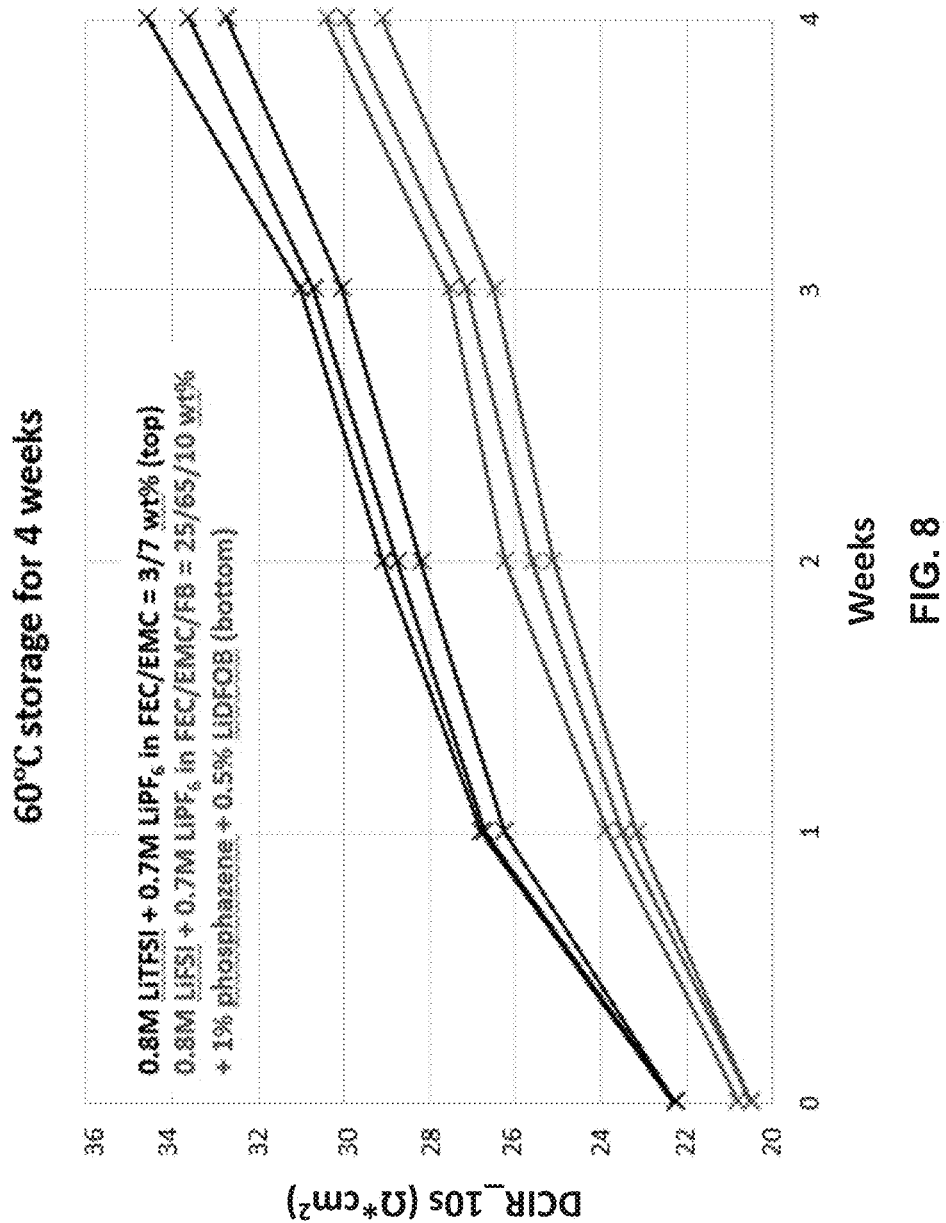
FIG. 8 shows the DCIR (10 s) of 2 types of electrolyte compositions during 60° C. storage for 4 weeks, in accordance with an example embodiment of the disclosure.

FIG. 8 shows the DCIR (10 s) during 60° C. storage for 4 weeks, and illustrates that cells with LiFSI, FB, phosphazene and LiDFOB have lower DCIR as well as lower DCIR growth comparing to cells with LiTFSI and no additives. The anode may contain 86% Si, 4% conductive carbon and 10% pyrolytic carbon. The cathode may be a NCM811 cathode with 92% active material, 4% conductive carbon and 4% binder. FIG. 8 specifically shows the DCIR (10 s) of 2 types of electrolyte compositions during 60° C. storage for 4 weeks. Black/top: 0.8 M LiTFSI+0.7 M $LiPF_6$ in FEC/EMC=3/7 wt %; Red/bottom: 0.8 M LiFSI+0.7 M $LiPF_6$ in FEC/EMC/FB=25/65/10 wt %+1% phosphazene+0.5% LiDFOB.

Figure 9:
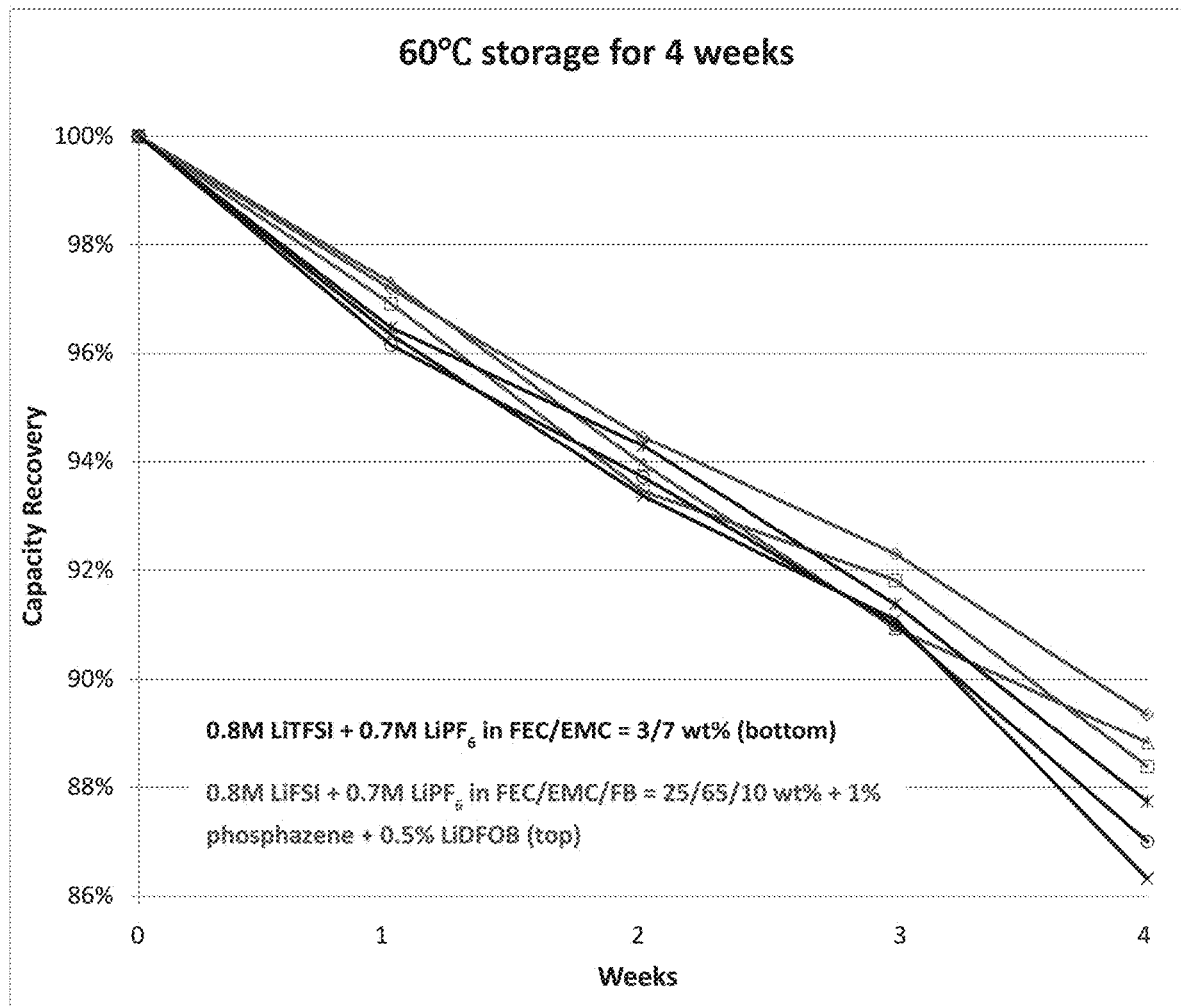
FIG. 9 shows capacity recovery of 2 types of electrolyte compositions during 60° C. storage for 4 weeks, in accordance with an example embodiment of the disclosure.

FIG. 9 shows the capacity recovery during 60° C. storage for 4 weeks, and illustrates that cells with LiFSI, FB, phosphazene and LiDFOB have higher capacity recovery after 4 weeks comparing to cells with LiTFSI and no additives. The anode may contain 86% Si, 4% conductive carbon and 10% pyrolytic carbon. The cathode may be a NCM811 cathode with 92% active material, 4% conductive carbon and 4% binder. FIG. 9 specifically shows capacity recovery of 2 types of electrolyte compositions during 60° C. storage for 4 weeks. Black/bottom: 0.8 M LiTFSI+0.7 M $LiPF_6$ in FEC/EMC=3/7 wt %; Red/top: 0.8 M LiFSI+0.7 M v in FEC/EMC/FB=25/65/10 wt %+1% phosphazene+0.5% LiDFOB.

Figure 10:
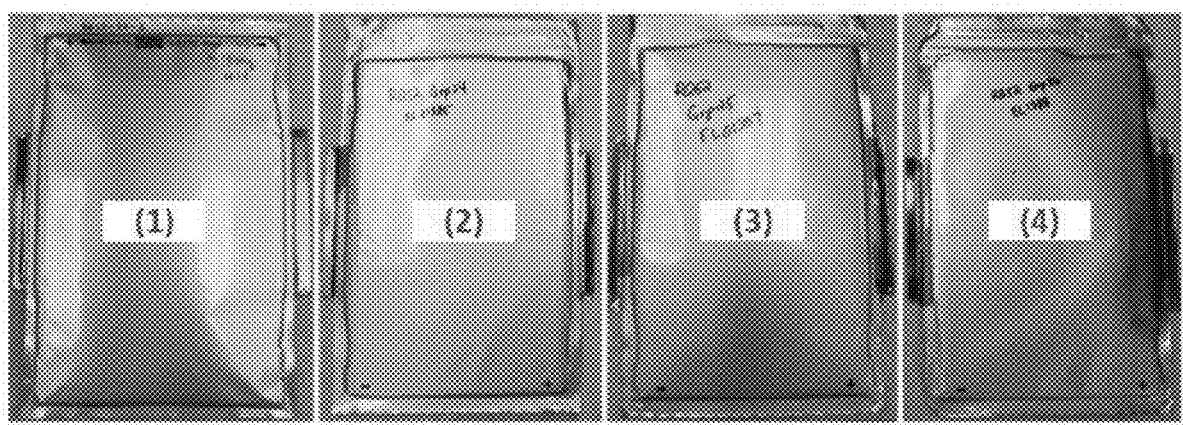
FIG. 10 shows photos illustrating the amount of gas generated after 72° C. storage for 60 hours in a large stacked cell for 4 types of electrolyte compositions, in accordance with an example embodiment of the disclosure.

FIG. 10 shows photos illustrating the amount of gas generated in ~50 Ah pouch stacked cells after 72° C. storage for 60 hours, for four different compositions. The electrolytes labelled (2)-(4) contain sulfur-based additives and generated much less gas than the electrolyte labelled (1) which did not contain sulfur-based additives. The anode may contain 86% Si, 4% conductive carbon and 10% pyrolytic carbon. The cathode may be a NCM811 cathode with 92% active material, 4% conductive carbon and 4% binder. FIG. 10 specifically shows the amount of gas generated after 72° C. storage for 60 hours in a large stacked cell for 4 types of electrolyte compositions: (1): 0.8 M LiFSI+0.7 M $LiPF_6$ in FEC/EMC/FB=25/65/10 wt %+1% phosphazene+0.5% LiDFOB; (2): 0.8 M LiFSI+0.7 M $LiPF_6$ in FEC/PC/EMC=15/20/65 vol %+1% $LiPO_2F_2$+0.5% VC+1% PES; (3): 0.8 M LiFSI+0.7 M $LiPF_6$ in FEC/PC/EMC=15/20/65 vol %+1% $LiPO_2F_2$+0.5% VC+1% PS; (4): 0.8 M LiFSI+0.7 M $LiPF_6$ in FEC/PC/EMC=15/20/65 vol %+1% $LiPO_2F_2$+0.5% VC+1% TMS.

Figure 11:
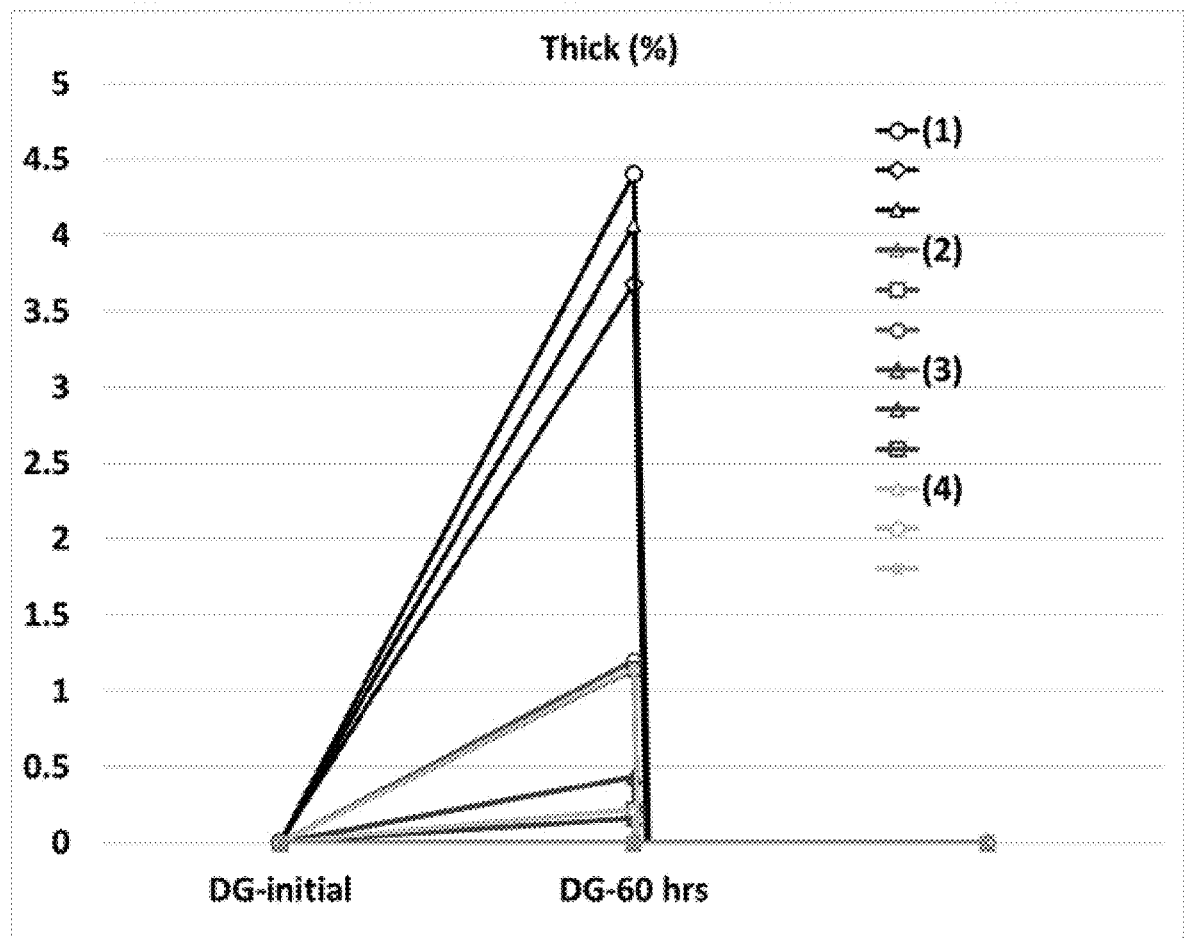
FIG. 11 shows the amount of gas generated after 72° C. storage for 60 hours in pouch cells containing 5 double-sided cathodes each for 4 types of electrolyte compositions, in accordance with an example embodiment of the disclosure.

FIG. 11 shows the amount of gas generated after 72° C. storage for 60 hours in 5-double-sided layer stacked prismatic pouch cells (cells containing 5 double-sided cathodes each) with a capacity of 0.5-1 Ah. The electrolytes labelled (2)-(4) contain sulfur-based additives and generated at least four times less gas than the electrolyte labelled (1) which did not contain sulfur-based additives. The anode may contain 86% Si, 4% conductive carbon and 10% pyrolytic carbon. The cathode may be a NCM811 cathode with 92% active material, 4% conductive carbon and 4% binder. FIG. 10 specifically shows the amount of gas generated after 72° C. storage for 60 hours in pouch cells containing 5 double-sided cathodes each for the following 4 types of electrolyte compositions: (1): 0.8 M LiFSI+0.7 M $LiPF_6$ in FEC/EMC/FB=25/65/10 wt %+1% phosphazene+0.5% LiDFOB; (2):

0.8 M LiFSI+0.7 M LiPF$_6$ in FEC/PC/EMC=15/20/65 vol %+1% LiPO$_2$F$_2$+0.5% VC+1% PES; (3): 0.8 M LiFSI+0.7 M LiPF$_6$ in FEC/PC/EMC=15/20/65 vol %+1% LiPO$_2$F$_2$+0.5% VC+1% PS; (4): 0.8 M LiFSI+0.7 M LiPF$_6$ in FEC/PC/EMC=15/20/65 vol %+1% LiPO$_2$F$_2$+0.5% VC+1% TMS.

Figure 12:
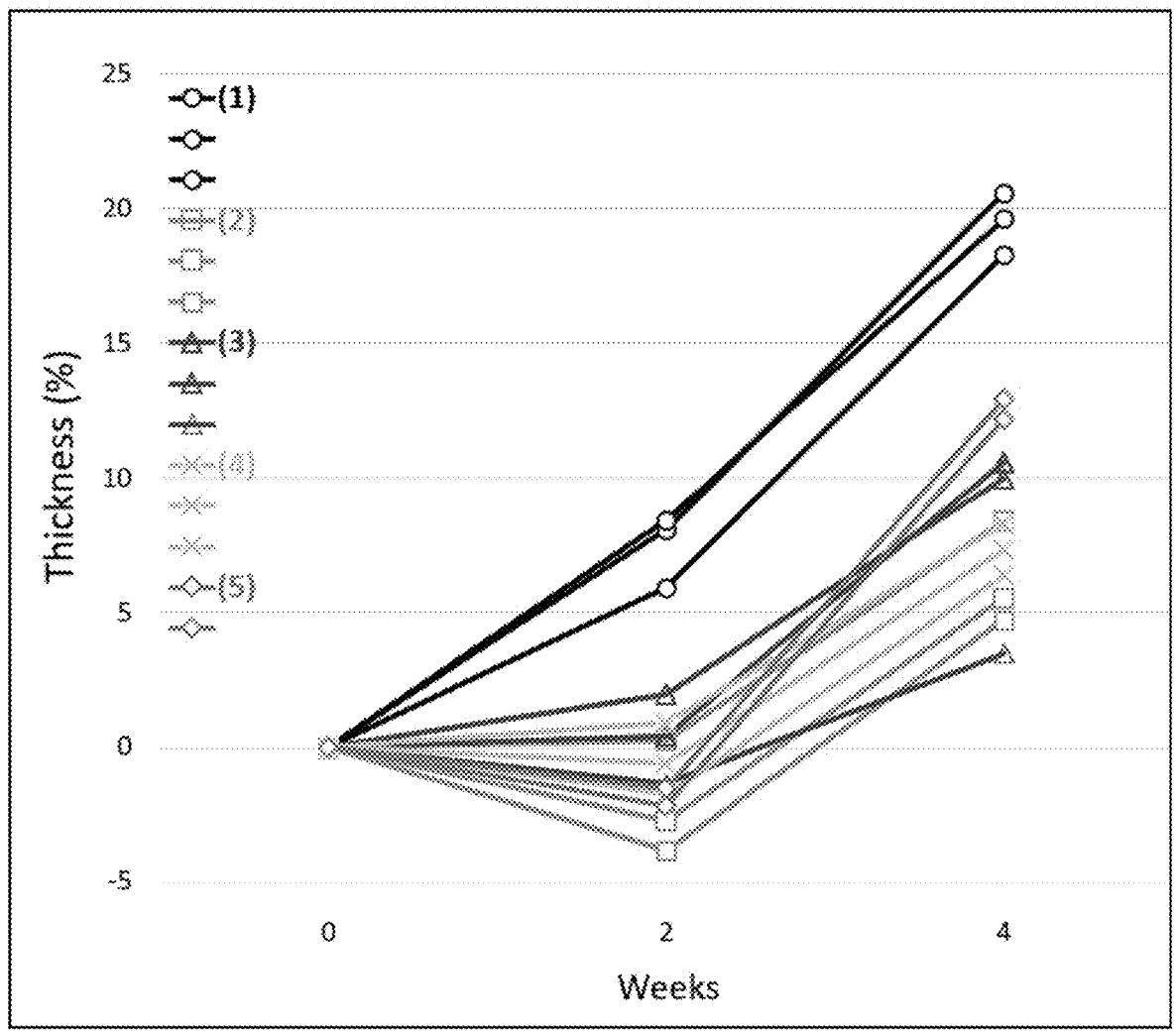
FIG. 12 shows the amount of gas generation (%) during 60° C. storage for 4 weeks for 5 types of electrolyte compositions, in accordance with an example embodiment of the disclosure.

FIG. 12 shows the amount of gas generation during 60° C. storage for 4 weeks in pouch cells containing 5 double-sided cathodes each. The electrolytes labelled (2)-(5) contain 1% of DTD, TMS, PS, or BS additives, respectively, which reduce gas generation by 8-15% as compared to the electrolyte labelled (1) which did not contain sulfur-based additives. The anode may contain 86% Si, 4% conductive carbon and 10% pyrolytic carbon. The cathode may be a NCM811 cathode with 92% active material, 4% conductive carbon and 4% binder. FIG. 12 specifically shows the amount of gas generation (%) during 60° C. storage for 4 weeks for the following 5 types of electrolyte compositions: (1) 0.8 M LiFSI+0.7 M LiPF$_6$ in FEC/EMC/FB (25/65/10, wt %)+1% phosphazene+0.5% LiDFOB, (2) 0.8 M LiFSI+0.7 M LiPF$_6$ in FEC/EMC/FB (25/65/10, wt %)+1% phosphazene+0.5% LiDFOB+1% DTD, (3) 0.8 M LiFSI+0.7 M LiPF$_6$ in FEC/EMC/FB (25/65/10, wt %)+1% phosphazene+0.5% LiDFOB+1% TMS, (4) 0.8 M LiFSI+0.7 M LiPF$_6$ in FEC/EMC/FB (25/65/10, wt %)+1% phosphazene+0.5% LiDFOB+1% PS, (5) 0.8 M LiFSI+0.7 M LiPF$_6$ in FEC/EMC/FB (25/65/10, wt %)+1% phosphazene+0.5% LiDFOB+1% BS.

Figure 13:
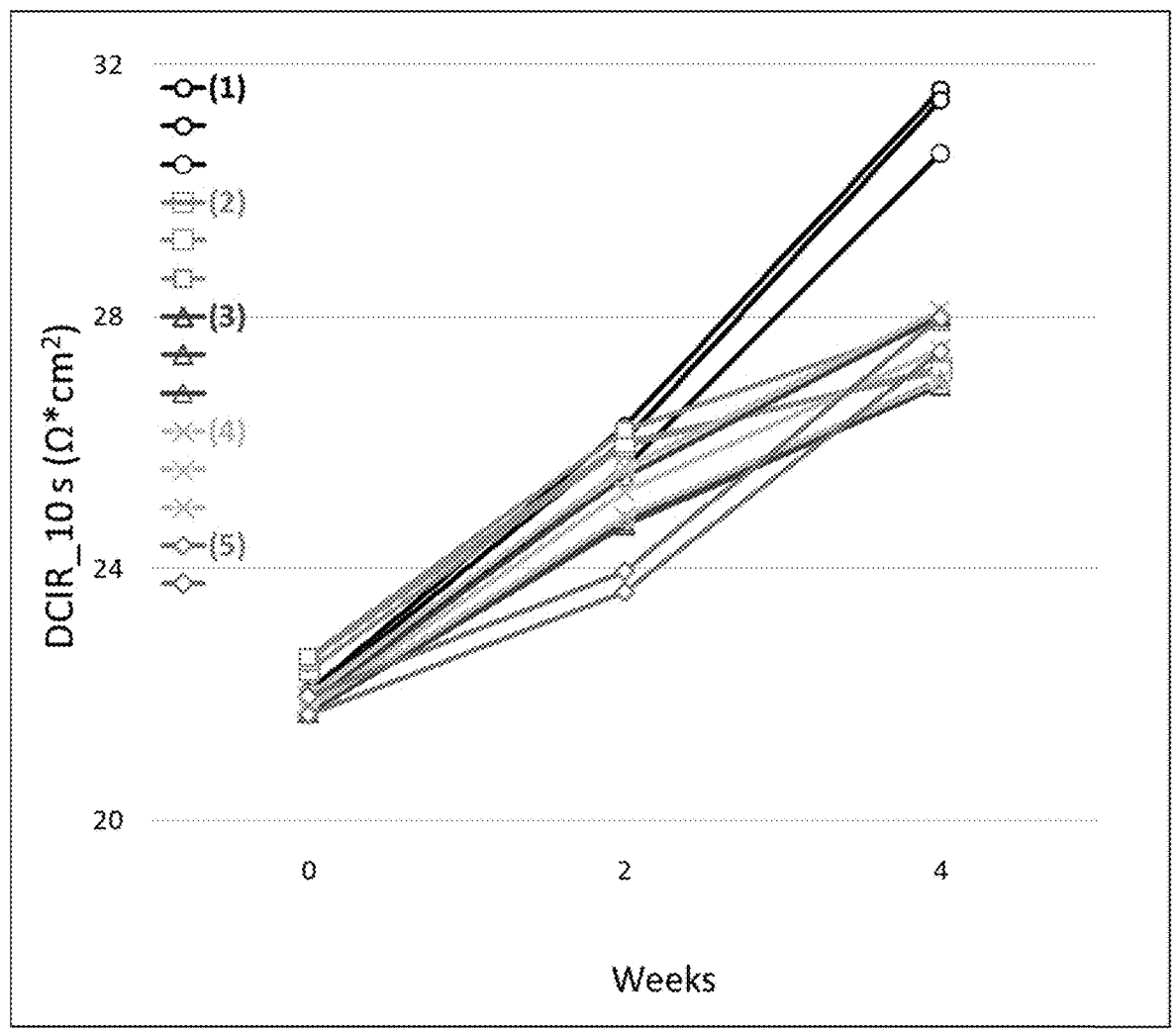
FIG. 13 shows the amount of gas generation (%) during 60° C. storage for 4 weeks for 5 types of electrolyte compositions, in accordance with an example embodiment of the disclosure.

FIG. 13 shows DCIR (10 s) during 60° C. storage for 4 weeks, and illustrates that cells containing electrolyte compositions with 1% of DTD, TMS, PS, and BS additives ((2)-(4)) have less gassing as well as lower DCIR growth after 4 weeks under 60° C. storage compared to cells with electrolyte compositions without sulfur-based additives ((1)). The anode may contain 86% Si, 4% conductive carbon and 10% pyrolytic carbon. The cathode may be a NCM811 cathode with 92% active material, 4% conductive carbon and 4% binder. FIG. 13 specifically shows the DCIR (10 s) of 5 types of electrolyte compositions during 60° C. storage for 4 weeks: (1) 0.8 M LiFSI+0.7 M LiPF$_6$ in FEC/EMC/FB (25/65/10, wt %)+1% phosphazene+0.5% LiDFOB, (2) 0.8 M LiFSI+0.7 M LiPF$_6$ in FEC/EMC/FB (25/65/10, wt %)+1% phosphazene+0.5% LiDFOB+1% DTD, (3) 0.8 M LiFSI+0.7 M LiPF$_6$ in FEC/EMC/FB (25/65/10, wt %)+1% phosphazene+0.5% LiDFOB+1% TMS, (4) 0.8 M LiFSI+0.7 M LiPF$_6$ in FEC/EMC/FB (25/65/10, wt %)+1% phosphazene+0.5% LiDFOB+1% PS, (5) 0.8 M LiFSI+0.7 M LiPF$_6$ in FEC/EMC/FB (25/65/10, wt %)+1% phosphazene+0.5% LiDFOB+1% BS.

Figure 14:
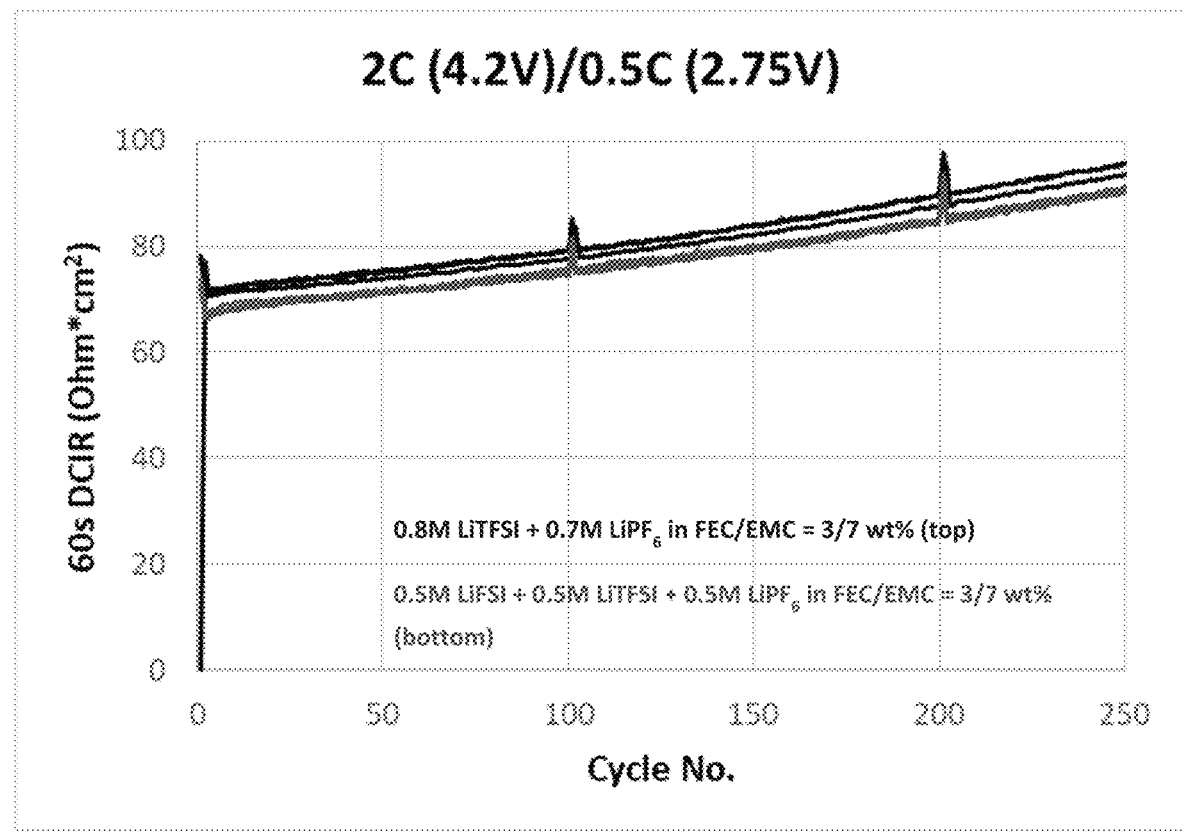
FIG. 14 shows the DCIR (60 s) of 2 types of electrolyte compositions during 2 C (4.2V)/0.5 C (2.75V) cycling at RT, in accordance with an example embodiment of the disclosure.

FIG. 14 shows cell DCIR (60 s discharge) during room temperature cycling, with 2 C charging to 4.2V until 0.05 C, and 0.5 C discharging to 2.75V. The figure illustrates that cells with 0.5 M LiFSI+0.5 M LiTFSI+0.5 M LiPF$_6$ in FEC/EMC 3/7 (w/w) have lower DCIR during cycling, compared to cells using 0.8 M LiTFSI+0.7 M LiPF$_6$ in FEC/EMC 3/7 (w/w) cycled under similar conditions. The anode may contain 90% Si and 10% pyrolytic carbon. The cathode may be a NCM811 cathode with 92% active material, 4% conductive carbon and 4% binder. FIG. 14 specifically shows the DCIR (60 s) of 2 types of electrolyte compositions during 2 C (4.2V)/0.5 C (2.75V) cycling at RT: Black/top: 0.8 M LiTFSI+0.7 M LiPF$_6$ in FEC/EMC=3/7 wt %; Red/bottom: 0.5 M LiFSI+0.5 M LiTFSI+0.5 M LiPF$_6$ in FEC/EMC=3/7 wt %.

Figure 15A:
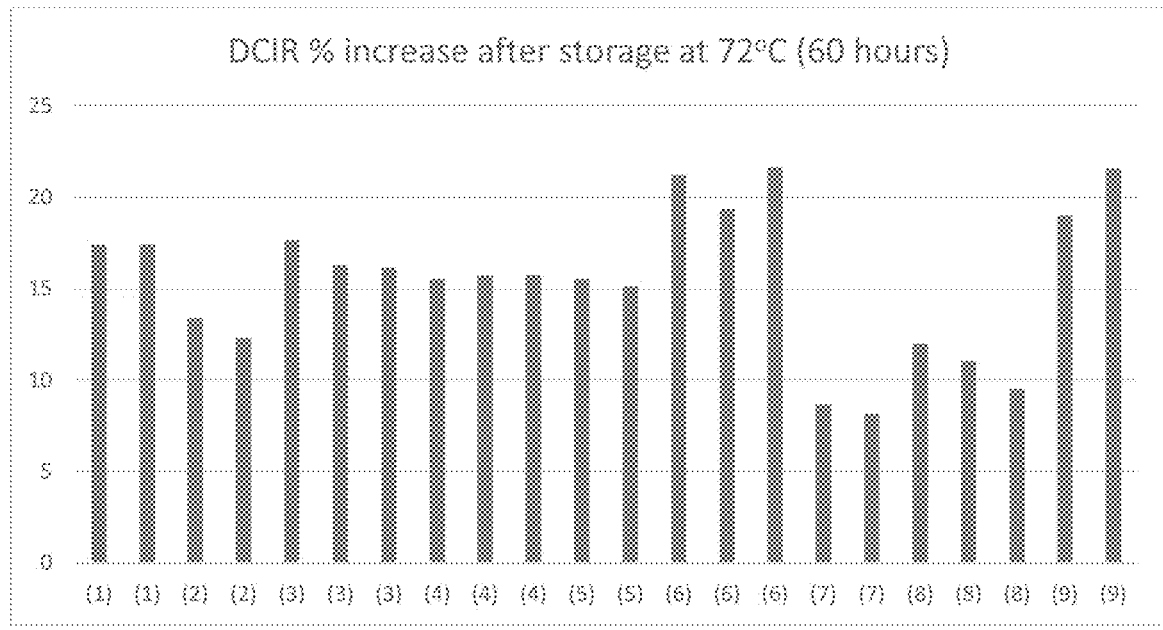
FIGS. 15A and 15B show performance of 5-layer pouch cells with 9 types of electrolyte compositions after storage at 72° C. for 60 hours, in accordance with an example embodiment of the disclosure.
Figure 15B:
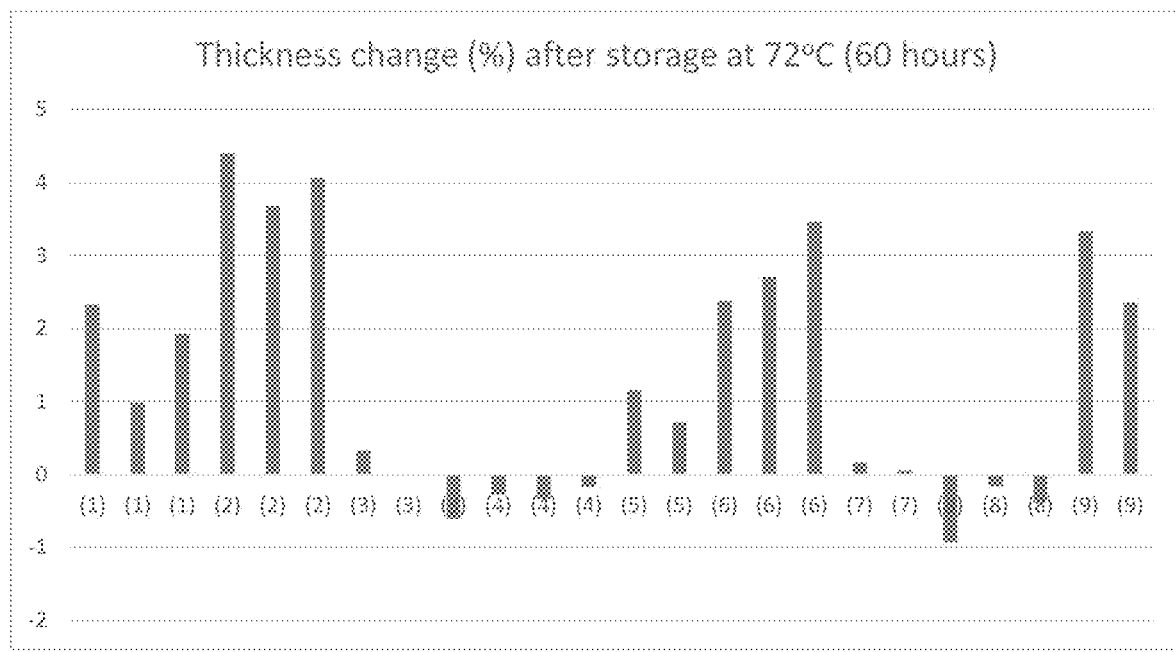

FIGS. 15A and 15B show performance of 5-layer pouch cells with 9 types of electrolyte compositions after storage at 72° C. for 60 hours. FIG. 15A shows DCIR % increase and FIG. 15B shows thickness change (%). Components and amounts of electrolyte compositions (1)-(9) are shown in the table below:

| Electrolyte ID | Salt | Solvent | Additive 1 | wt. % | Additive 2 | wt. % | Additive 3 | wt. % |
|---|---|---|---|---|---|---|---|---|
| (1) | 0.8M LiTFSI + 0.7M LiPF$_6$ | FEC/EMC (3/7) | | | | | | |
| (2) | 0.8M LiTFSI + 0.7M LiPF$_6$ | FEC/EMC/FB (25/65/10) | phosphazene | 1% | LiDFOB | 0.5% | | |
| (3) | 1.3M LiTFSI + 0.2M LiBF$_4$ | FEC/EMC (3/7) | | | | | | |
| (4) | 1.3M LiTFSI + 0.2M LiBF$_4$ | FEC/EMC (3/7) | organosilicon | 2% | | | | |
| (5) | 1.3M LiTFSI + 0.2M LiPF$_6$ | FEC/EMC (3/7) | organosilicon | 2% | | | | |
| (6) | 0.8M LiTFSI + 0.7M LiPF$_6$ | FEC/EMC (3/7) | organosilicon | 2% | | | | |
| (7) | 0.8M LiTFSI + 0.7M LiPF$_6$ | FEC/EMC (3/7) | PES | 0.5% | DTD | 0.5% | | |
| (8) | 0.8M LiTFSI + 0.7M LiPF$_6$ | FEC/EMC (3/7) | organosilicon | 2% | PES | 0.5% | DTD | 0.5% |
| (9) | 0.8M LiTFSI + 0.7M LiPF$_6$ | FEC/EMC (3/7) | organosilicon | 2% | LiPO2F2 | 1% | | |

In the table above, numbers in parentheses are the percentage of the solvent/co-solvent(s) in the electrolyte composition, e.g., (3/7) means 30%/70% by weight, etc.

It can be seen from FIGS. 15A and 15B that reducing the concentration of LiPF$_6$ or replacing it with LiBF$_4$ in high FEC-content electrolyte formulations can significantly reduce gassing and DCIR growth during storage at high temperatures. Furthermore, additives like PES and DTD can also help reduce gassing and DCIR growth during storage while organosilicon additives do not seem to have an effect.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry, or a device is "operable" to perform a function whenever the battery, circuitry, or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An energy storage device comprising:
   a first electrode and a second electrode, wherein one or both of the first electrode and the second electrode is a Si-based electrode;
   a separator between the first electrode and the second electrode; and
   an electrolyte composition;
   wherein said electrolyte composition comprises two or more lithium salts,
   10-50 wt % of one or more fluorinated solvents,
   50-90 wt % of one or more non-fluorinated solvents, and
   one or more additives comprising a total of between 0.25-1.5 wt % of the total electrolyte composition; and
   wherein said one or more additives are selected from the group consisting of PES (prop-1-ene-1,3-sultone), TMSP (tris(trimethylsilyl)phosphite), TMS (trimethylene sulfate), TMSO (3-trimethylsilyl-2-oxazolidinone), and PMS (propargyl methanesulfonate);
   said Si-based electrode is a silicon dominant electrode where the amount of silicon in the active material comprises 70% or more by weight; and
   said one or more fluorinated solvents comprises fluorobenzene (FB).

2. The energy storage device of claim 1, wherein said two or more lithium salts have a total molarity between 1 and 2.

3. The energy storage device of claim 2, wherein said two or more lithium A salts have a total molarity between 1.2 and 1.6 M.

4. The energy storage device of claim 1, wherein two lithium salts are included in said electrolyte composition.

5. The energy storage device of claim 4, wherein said two lithium salts are selected from the group consisting of LiBF$_4$, LiFSI, LiTFSI and LiPF$_6$.

6. The energy storage device of claim 5, wherein said two lithium salts are LiTFSI and LiPF$_6$.

7. The energy storage device of claim 5, wherein said two lithium salts are LiFSI and LiPF$_6$.

8. The energy storage device of claim 1, wherein three lithium salts are included in said electrolyte composition.

9. The energy storage device of claim 1, wherein said two or more lithium salts are selected from the group consisting of lithium hexafluorophosphate (LiPF$_6$), lithium tetrafluoroborate (LiBF$_4$), lithium hexafluoroarsenate monohydrate (LiAsF$_6$), lithium perchlorate (LiClO$_4$), lithium bis(trifluoromethanesulfonyl)imide (LiTFSI), lithium bis(fluorosulfonyl)imide (LiFSI), lithium bis(oxalato)borate (LiBOB), lithium difluoro(oxalate)borate (LiDFOB), lithium triflate (LiCF$_3$SO$_3$), lithium tetrafluorooxalato phosphate (LTFOP), lithium difluorophosphate (LiPO$_2$F$_2$), lithium pentafluoroethyltrifluoroborate (LiFAB), and lithium 2-trifluoromethyl-4,5-dicyanoimidazole (LiTDI), lithium bis(2-fluoromalonato)borate (LiBFMB), lithium 4-pyridyl trimethyl borate (LPTB), lithium 2-fluorophenol trimethyl borate (LFPTB), lithium catechol dimethyl borate (LiCDMB), and lithium tetrafluorooxalatophosphate (LiFOP).

10. The energy storage device of claim 1, wherein said FB is present in the electrolyte composition at between 10 and 20 percent by weight.

11. The energy storage device of claim 1, wherein said one or more non-fluorinated solvents are selected from the group consisting of one or more of EC (ethylene carbonate), PC (propylene carbonate), EMC (ethyl methyl carbonate), DMC (dimethyl carbonate), DEC (diethyl carbonate), GBL (gamma butyrolactone), MA (methyl acetate), EA (ethyl acetate), t-BC (trans-butylene carbonate), PMC (propyl methyl carbonate), DME (dimethoxyethane), EME (ethoxymethoxyethane), methyl propanoate and DEE (diethoxyethane).

12. The energy storage device of claim 11, wherein said one or more non-fluorinated solvents comprises EMC.

13. The energy storage device of claim 11, wherein said EMC is present in the electrolyte composition in an amount of 70-90% by weight.

14. The energy storage device of claim 1, wherein said silicon in the active material comprises silicon particles.

15. The energy storage device of claim 1, wherein said silicon particles are substantially silicon or a silicon alloy.

16. The energy storage device of claim 1, wherein said silicon in the active material comprises silicon as the primary constituent along with one or more other elements.

17. The energy storage device of claim 1, wherein two fluorinated solvents are included in said electrolyte composition.

18. The energy storage device of claim 2, wherein the second fluorinated solvent is selected from the group consisting of FEC (fluoroethylene carbonate), F2EC (difluoroethylene carbonate), TTE (1,1,2,2-tetrafluoroethyl-2,2,3,3-tetrafluoropropyl ether), HFPM (1,1,1,3,3,3-hexafluoroisopropyl methyl ether), PTM (Phenyl trifluoromethane sulfonate), NOB (N,O-bis(trimethylsilyl)-trifluoroacetamide), FEMC (2-fluoroethyl methyl carbonate), FDMC (fluoromethyl methyl carbonate), FPC (4-fluoromethyl-1,3-dioxolan-2-one), F3EMC (methyl 2,2,2-trifluoroethyl carbonate), 1,1,2,2-Tetrafluoro-3-(1,1,2,2-tetrafluoroethoxy)-propane (TFTFEP), methyl nanofluorobutyl ether (MFE), ethyl nanofluorobutyl ether (EFE), 2-trifluoromethyl-3-methoxyperfluoropentane (TMMP), 2-(trifluoro-2-fluoro-3-difluoropropoxy)-3-difluoro-4-fluoro-5-trifluoropentane (TPTP), 2,2-bis(trifluoromethyl)-1,3-dioxolane, 2,2-dimethyl-4,5-difluoro-1,3-dioxolane, 2,2-dimethyl-4,4,5,5-tetrafluoro-1,3-dioxolane, 2-fluoroethoxymethoxyethane (FEME), 2,2-difluoroethoxymethoxyethane (DFEME), methoxy-2,2,2-trifluoroethoxyethane (TFEME), ethoxy-2-fluoroethoxyethane (EFEE), 2,2-difluoroethoxyethoxyethane (EDFEE), and ethoxy-2,2,2-trifluoroethoxyethane (ETFEE).

19. The energy storage device of claim 18, wherein said second fluorinated solvent comprises fluoroethylene carbonate (FEC).

20. The energy storage device of claim 19, wherein said FEC is present in the composition at between 10 and 30 percent by weight.

\* \* \* \* \*